United States Patent [19]

Krasuk et al.

[11] Patent Number: 4,591,426
[45] Date of Patent: May 27, 1986

[54] PROCESS FOR HYDROCONVERSION AND UPGRADING OF HEAVY CRUDES OF HIGH METAL AND ASPHALTENE CONTENT

[75] Inventors: Julio H. Krasuk, Caracas; Fernando J. Silva, Miranda; Roberto E. Galiasso, Miranda; Alfredo Souto, Miranda, all of Venezuela

[73] Assignee: Intevep, S.A., Caracas, Venezuela

[21] Appl. No.: 479,394

[22] Filed: Mar. 28, 1983

Related U.S. Application Data

[63] Continuation-in-part of Ser. No. 309,798, Oct. 8, 1981, abandoned.

[51] Int. Cl.[4] .................... C10G 47/04; C10G 65/12; C10G 67/04
[52] U.S. Cl. ........................... 208/96; 208/97; 208/111; 208/112; 208/216 R; 208/216 PP; 208/251 H; 208/121
[58] Field of Search ........... 208/110, 111, 112, 216 R, 208/216 PP, 210, 96, 97, 251 H, 162

[56] References Cited

U.S. PATENT DOCUMENTS

| 3,575,848 | 4/1971 | Miale | 208/112 |
|---|---|---|---|
| 3,682,811 | 8/1972 | Mulaskey | 208/111 |
| 3,838,041 | 9/1974 | Sawyer et al. | 208/120 |
| 3,859,199 | 1/1975 | Gatsis | 208/97 |
| 3,936,371 | 2/1976 | Ueda et al. | 208/253 |
| 4,002,463 | 1/1977 | Nestoridis | 75/1 R |
| 4,016,067 | 4/1977 | Fischer et al. | 208/89 |
| 4,046,670 | 9/1977 | Seguchi et al. | 208/121 X |
| 4,066,530 | 1/1978 | Aldridge et al. | 208/207 |
| 4,115,324 | 9/1978 | Ozaki et al. | 208/121 X |
| 4,211,755 | 7/1980 | Dunn, Jr. | 423/74 |
| 4,224,140 | 9/1980 | Fujimori et al. | 208/124 |
| 4,298,460 | 11/1981 | Fujimori et al. | 208/121 |
| 4,325,812 | 4/1982 | Fujimori et al. | 208/119 |
| 4,508,616 | 4/1985 | Larrauri et al. | 208/213 |

Primary Examiner—Andrew H. Metz
Assistant Examiner—O. Chaudhuri
Attorney, Agent, or Firm—Bachman & LaPointe

[57] ABSTRACT

A process for upgrading feedstocks containing not less than about 200 ppm metals, an API gravity of less than about 20°, a Conradson Carbon of more than about 8%, by hydroconversion with hydrogen in the presence of a naturally occurring inorganic material as a catalyst. The invention further provides, inter alia, subsequently fractionating the hydroconverted product and solvent deasphalting the distillation bottoms and optionally hydrodesulfurizing atmospheric distillates and the mix of vacuum gas oils and deasphalted oils separately. When a heavy crude of 12° API, 10% Conradson Carbon, 3.2% sulfur and 350 ppm metals is fed to this process, more than 90% (v/v) of a synthetic crude of 25°API, 0.17% sulfur and only 13.8% (v/v) 950° F.+ fraction may be obtained.

29 Claims, 4 Drawing Figures

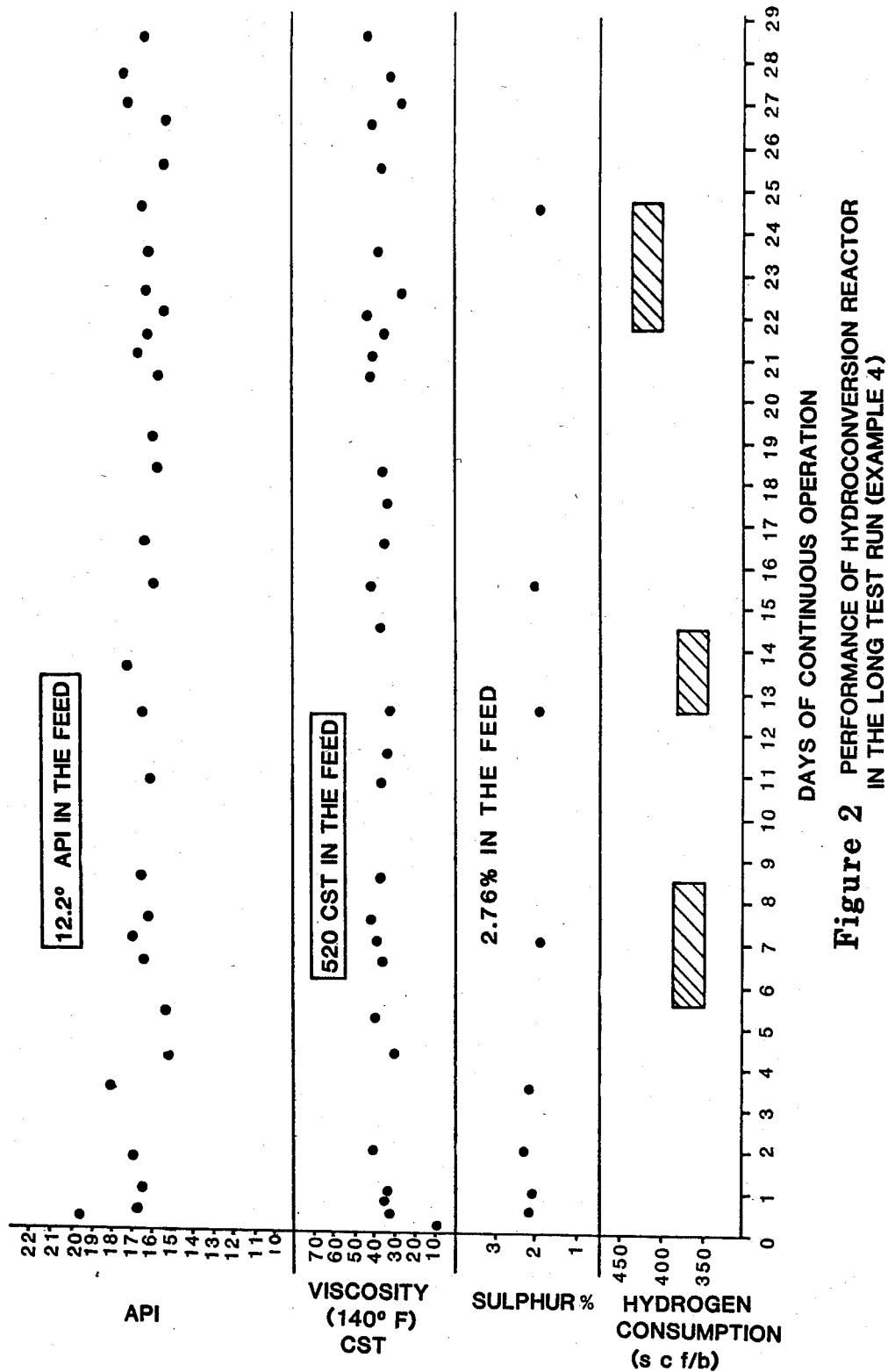
Figure 2  PERFORMANCE OF HYDROCONVERSION REACTOR IN THE LONG TEST RUN (EXAMPLE 4)

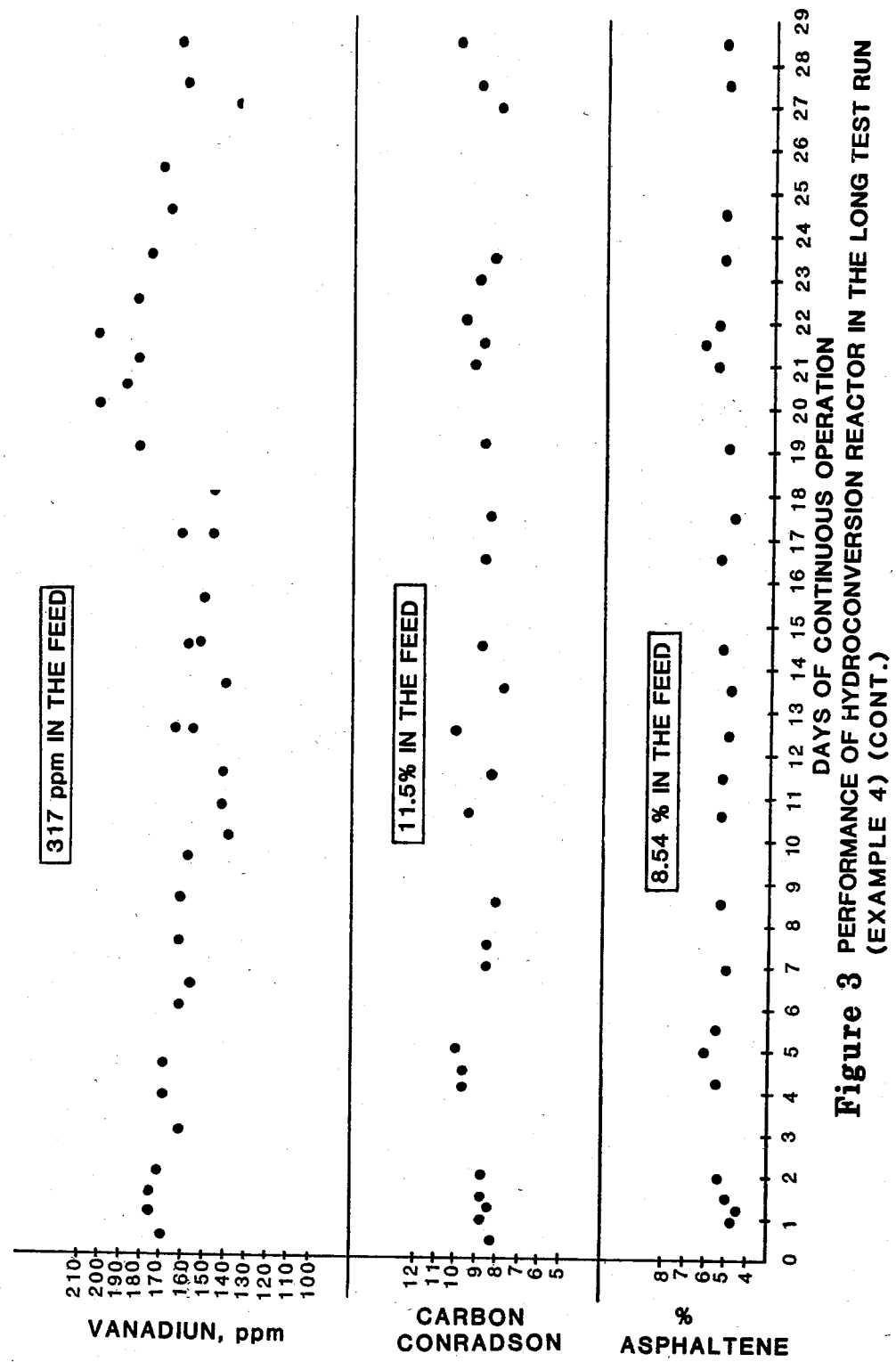

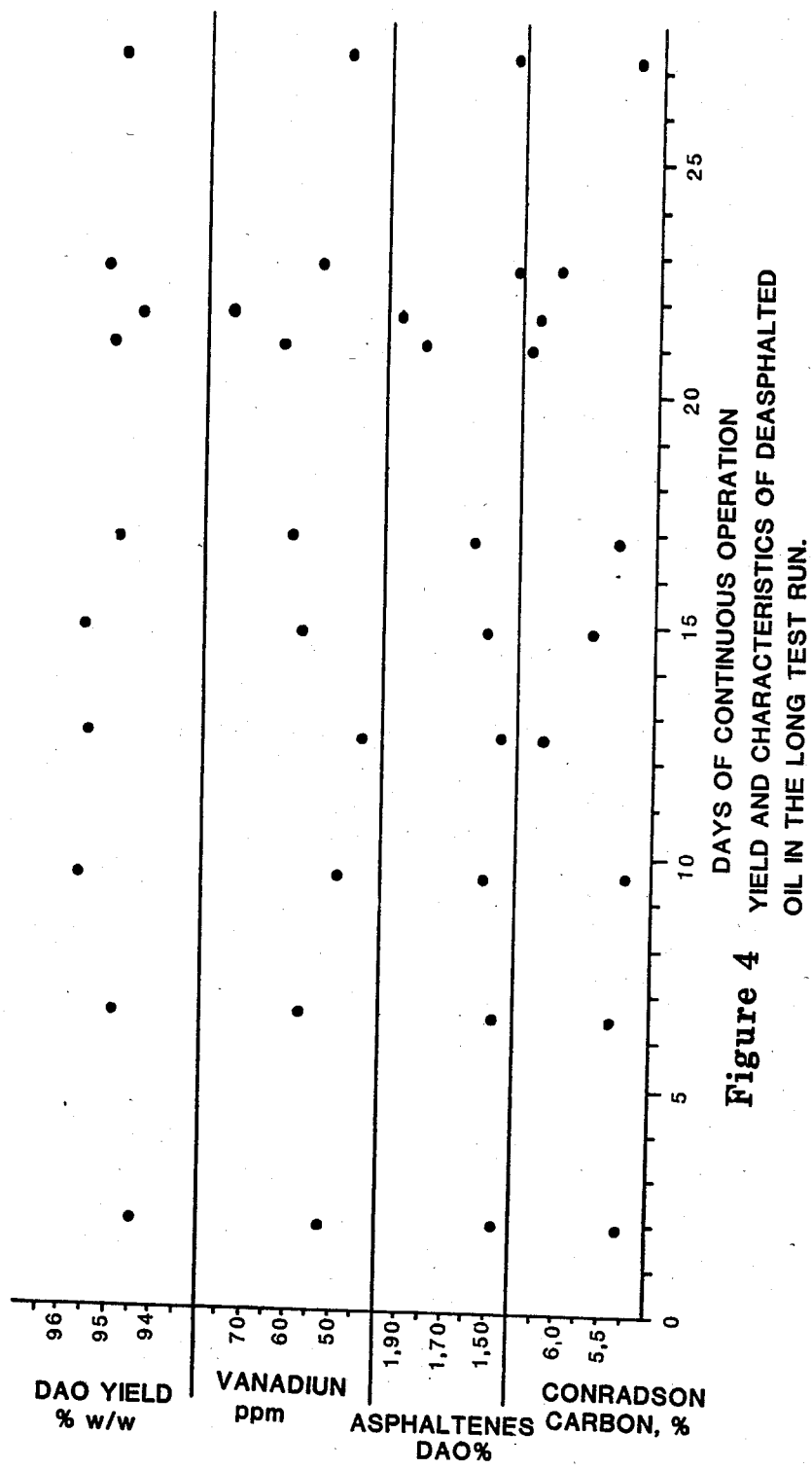
Figure 4 YIELD AND CHARACTERISTICS OF DEASPHALTED OIL IN THE LONG TEST RUN.

PROCESS FOR HYDROCONVERSION AND UPGRADING OF HEAVY CRUDES OF HIGH METAL AND ASPHALTENE CONTENT

CROSS-REFERENCE TO RELATED APPLICATIONS

This application is a continuation-in-part application of copening application Ser. No. 309,798, filed Oct. 8, 1981, now abandoned.

BACKGROUND OF THE INVENTION

This invention relates to the upgrading of heavy crude feedstocks of high molecular weight. Such crudes are characterized by high metal, sulfur, Conradson Carbon, and asphaltene content. This invention will thus be useful in geographic areas, such as the Orinoco Oil Belt, the Tar Sands of Athabasca, and Boscan, etc., where this type of crude is common. Typically, crudes from these areas have a metal content of 400-1400 ppm of vanadium (V) plus nickel (Ni), a sulfur content of 3-5%, a high content of both Conradson Carbon and asphaltene, and a small (30-40% v/v) distillate fraction. The high viscosity and density of these crudes make them difficult to transport. In addition, their processing in conventional refineries is not possible.

Numerous publications describe methods of producing distillates and removal of asphaltenes and/or metals through the use of one or several conversion stages. For example, Venezuelan Pat. No. 2144-77 discloses a catalytic hydrocracking or cracking process using conventional catalysts followed by catalytic hydrotreatment and deasphalting operation as supplemental stages. In U.S. Pat. No. 3,576,737 a vacuum residue is treated with a vanadium containing catalyst, having pores larger than 300 Å in diameter, at a temperature of 600° to 900° F. and a hydrogen pressure of 100 to 3000 psig. Metal removal using a catalyst consisting of Group VIB or Group VIII metals, supported on alumina, is taught by U.S. Pat. No. 3,227,645. Other descriptions of the prior art are contained in U.S. Pat. No. 2,689,825, which discloses the use of catalysts removed from the catalytic cracking zone and their employment as metal contaminant-absorbing elements, and U.S. Pat. No. 3,876,530, which describes several stages of treatment with Group VIB and Group VIII catalysts on neutral alumina. This patent in turn mentions other catalysts of the CoMo and NiMo type on different carriers.

The use of synthetic supports such as alumina, silica-alumina, or zeolites, either alone or impregnated with active metals, has limitations when employed on a crude such as those contemplated by this invention. For example, black oils, which are the preferred feedstock for the present invention, have a high concentration of metal contaminants (typically over 400 ppm of V+Ni) in the form of dissolved organo-metallic compounds. These compounds decompose under typical processing conditions and deposit on the surface of the catalyst, decreasing catalyst activity. This catalyst degradation increases the aost of the upgrading process.

A synthetic suspended catalyst for use in hydrogenolysis of heavy crudes is described in U.S. Pat. No. 2,715,603. Severe temperature and pressure conditions are employed. The product, after fractionation and deasphalting, is converted to distillates. U.S. Pat. No. 4,176,048 discloses a first hydrotreating stage, followed by a deasphalting step and an intense hydrocracking of the deasphalted oils. The catalysts employed are Group VIB and Group VIII metals, supported on a refractory material of large pore diameters.

U.S. Pat. No. 2,771,401 describes the use of a synthetic cracking catalyst for demetallization purposes. Similarly, U.S. Pat. No. 3,893,913 discloses the use of a naturally available material, such as bauxite, impregnated with a Group VIB or Group VIII metal.

In the prior art, when inexpensive carriers such as bauxite have been employed in the hydrotreating or hydrocracking step, the degree of demetallization of the crude has been limited despite severe processing conditions of 2000 psi or more. Accordingly, the quality of the unconverted material (i.e., that boiling over 950° F.) is low. It is also well known that these bottoms are unstable and carbonaceous deposits tend to precipitate therein when they are mixed with lighter fractions, as is common in the industry.

U.S. Pat. Nos. 2,975,121 and 2,910,434 disclose non-catalytic demetallization processes consisting of hydrogenation of black oil, either in a homogenous phase or employing an inert solid, followed by solvent deasphalting. This procedure gives rise to considerable gas and coke production, which diminishes the liquid yield of the upgraded product.

U.S. Pat. No. 4,298,460 discloses the use of iron catalysts, primarily for capturing sulfur in its reduced state (valence less than three). However, such reduced catalysts incur larger hydrogen consumptions and increased capital costs because a reduction stage would be required before the catalyst enters the hydroconversion reactor. This does not produce any known beneficial effect with respect to the hydroconversion process. Furthermore, presulfided iron catalysts which are effective in hydroconversion are ineffective for the purposes of U.S. Pat. No. 4,298,460. Because of these limitations of the distinctly different processing routes, U.S. Pat. No. 4,298,460 teaches that at least 30% iron is required, whereas it has now been discovered in this invention described below that this high iron content is unnecessary for hydroconversion processes. These distinctions are further emphasized by U.S. Pat. No. 4,298,460 which is directed to a fluid catalytic cracking process giving rise to high coke production and low liquid yield of the upgraded product. As is well known, a high liquid yield, in % by weight in the upgrading process, is an essential requirement for syncrude projects to be economical. It has now been advantageously found in this invention herein that a 92% by weight yield of high quality upgraded crude is obtained in contrast to U.S. Pat. No. 4 298,460. Furthermore, as demonstrated herein this high liquid yield is all distillable $C_5+$ meaning that 100% conversion of the vacuum bottoms (950° F.+) of the heavy crude is achieved through the present invention. Also, it is known in the art that a catalyst composition effective in fluid catalytic cracking is ineffective in hydroconversion (see Charles L. Thomas, *Catalytic Processes and Proven Catalysts*, pages 29-32 and page 175). Such catalytic cracking catalysts, when employed in hydroconversion have historically produced unsatisfactorily high coke yields.

U.S. Pat. No. 3,859,199 includes a deasphalting section after a catalytic desulphurization section, in which expensive synthetic catalysts (cobalt/molybdenum on alumina is recommended) are employed. Feed to the catalytic desulphurization section is an asphaltenic feedstock of which no reference is made to its metal content. Where a feedstock high in metal content, e.g., greater than 200 ppm metals is employed, this high level of metals would quickly poison the catalysts in the catalytic desulphurization section, as proposed in U.S. Pat. No. 3,859,199, thereby incurring a high operating cost because of large consumption of expensive catalysts.

The above processes all have limitations with respect to the extent to which heavy feedstocks are upgraded or with respect to the economic attractiveness of the process due to high catalyst cost, low quality in some fractions of the product, or excessive capital costs due to the need for severe processing conditions.

SUMMARY OF THE INVENTION

An object of this invention is to provide high quality hydrocarbon products, at a reduced cost, from heavy asphaltic crudes or residual oils. This objective is achieved by a process utilizing an inexpensive naturally occurring material as a catalyst, which may be partially or totally recycled, and specific processing conditions. Also, the solvent which may be employed in the process can be generated by the process itself. Finally, relatively mild temperature and pressure conditions are required. All of these factors serve to reduce upgrading costs.

Also an object of the present invention is to provide a process for upgrading heavy oils and converting them into high quality hydrocarbons, mostly having boiling points below 1050° F. The heavy oil feedstocks contemplated for this invention typically have an API gravity of less than about 20°, contain more than about 2% sulfur, contain more than about 400 ppm V+Ni, contain greater than about 8% Conradson Carbon, and contain less than about 40% by volume of fractions boiling below about 1050° F.

According to one embodiment of this invention, the process comprises hydroconverting a heavy crude feedstock containing at least about 200 ppm metals, having an API gravity of less than about 20° and having a Conradson Carbon of more than about 8 by contacting the feedstock in a reaction zone with hydrogen and, as a catalyst, a readily available naturally occurring inorganic material containing elements as set forth in the representational formula (I) below:

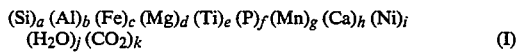

$$(Si)_a (Al)_b (Fe)_c (Mg)_d (Ti)_e (P)_f (Mn)_g (Ca)_h (Ni)_i (H_2O)_j (CO_2)_k \qquad (I)$$

where the subscripts a, b, c, d, e, f, g, h, i, j, and k each represent the molar proportion of the element in the formula (I) for which it is the subscript, the molar proportion for each element being calculated as follows:

Si as $SiO_2$,
Al as $Al_2O_3$,
Fe as $Fe_2O_3$,
Mg as MgO,
Ti as $TiO_2$,
P as $P_2O_5$,
Mn as MnO,
Ca as CaO, and
Ni as NiO;
and where
(j+k)≧0.20
(c+g+i)≧0.03 and (c+i)<0
(a+b+d+e+f+h)≧0.05 and (a+b+d+e)>0

In another embodiment of this invention, the invention provides a process as described above employing a catalyst of the formula (I) above, where
(j+k)≧0.20
(c+g+i)≧0.01 and i≧0.01
(a+b+d+e+f+h)≧0.05 and (a+b+d+e)>0

In an even further embodiment of this invention, the invention provides a process as described above employing a particularly preferred catalyst of the formula (I) above, where
(j+k)≧0.20
(c+g+i)≧0.1 and (c)≧0.15
(a+b+d+e+f+h)≧0.08 and (a+b+d+e)≧0.07

In another embodiment of this invention, the invention provides a process as described in the above embodiments wherein the catalyst comprises the naturally occurring material of the composition (I) above where the naturally occurring material has been further activated by subjection to a thermal treatment at a temperature between about 400° C. and 1100° C. for about 1 minute to about 4 hours and results in the catalyst having the following characteristics:

(a) a specific surface area, Sg, in square meters per gram of about 10 to about 200, preferably 20 to 150;
(b) a specific pore volume, Vp, in cubic centimeter per gram of about 0.1 to about 0.9, preferably 0.2 to 0.8;
(c) an average pore diameter, $\bar{d}$, in angstroms of about 20 to about 3600, preferably 53 to 1600, where $\bar{d} = 4Vp/Sg$, and
(d) a pore size distribution in accordance with the following Table 1

TABLE 1

| Pores of Radius r | Percentage of Total Pore Volume | |
| (in angstroms) | Broad | Preferred |
| --- | --- | --- |
| greater than 1000 | 5 to 60 | 20 to 50 |
| 1000 to greater than 300 | 5 to 50 | 10 to 40 |
| 300 to greater than 100 | 5 to 30 | 8 to 25 |
| 100 to greater than 40 | 6 to 30 | 6 to 10 |
| 40 or less | 4 to 60 | 4 to 30 |

In an even further embodiment of this invention, this invention provides a process as described above wherein the catalyst comprises a naturally occurring material containing the elements as set forth in the formula (I) above and the catalyst is selected from the group consisting of iron laterite, nickel laterite, siderite, limonite, bauxite and an aluminosilicate clay.

Also, an embodiment of this invention provides a process as described above wherein the catalyst comprises a naturally occurring material containing the elements as set forth in the formula (I) above and the catalyst is selected from the group consisting of iron laterite, nickel laterite, siderite, limonite, bauxite and an aluminosilicate clay, wherein the naturally occurring material has been further activated by subjection to a thermal treatment at a temperature between about 400° C. and 1100° C. for about 1 minute to about 4 hours and thereby has the specific surface area, Sg, specific pore volume, Vp, the average pore diameter, $\bar{d}$, and pore size distribution characteristics set forth above.

An additional embodiment of this invention provides a process comprising contacting the heavy crude feed stock with hydrogen and in the presence of a catalyst, as described above, and then separating the catalyst from the reaction mixture. The catalyst may then be partially or completely recycled to the reaction zone, if desired. Optionally, the process of this invention additionally includes an integrated process for upgrading heavy crude feed stocks comprising:

(a) hydroconverting a heavy crude feedstock in a hydroconversion reaction zone in the presence of hydrogen and a hydroconversion catalyst of the formula (I) to produce a hydroconversion effluent, as described above, and additionally, one or more of the following steps:

(b) distilling the effluent from the hydroconversion reaction zone either with or without catalyst removal, to produce a distillate fraction and a heavy bottoms fraction; and optionally, recycling the heavy bottoms fraction to the hydroconversion reaction zone, (c) deasphalting the heavy bottoms fraction obtained in distillation of the hydroconversion effluent in (a) above using a lighter hydrocarbon fraction as a deasphalting solvent;

(d) desulfurizing the deasphalted oil obtained in (c) above and vacuum gas oils having a boiling point of about 650° F. to 1050° F. of the distillate fraction obtained in (b) above in the presence of a desulfurizing catalyst;

(e) hydrotreating atmospheric distillates of the distillate fraction obtained in (b) above in the presence of a hydrotreating catalyst; and (f) reusing regenerated hydroconversion catalyst by burning off substantial carbon (coke) on the recovered catalyst where catalyst removal is involved in (b) above, and partially or completely recycling the regenerated catalyst to the reaction zone of (a) above.

BRIEF DESCRIPTION OF THE DRAWINGS

FIGS. 2 and 3 show the performance of a hydroconversion reaction zone in a long test run carried out in accordance with a process involving an embodiment of this invention.

FIG. 4 depicts the yield and other characteristics of the deasphalted oil obtained from the long test run shown in FIGS. 2 and 3.

DETAILED DESCRIPTION OF THE INVENTION

Figure 1:
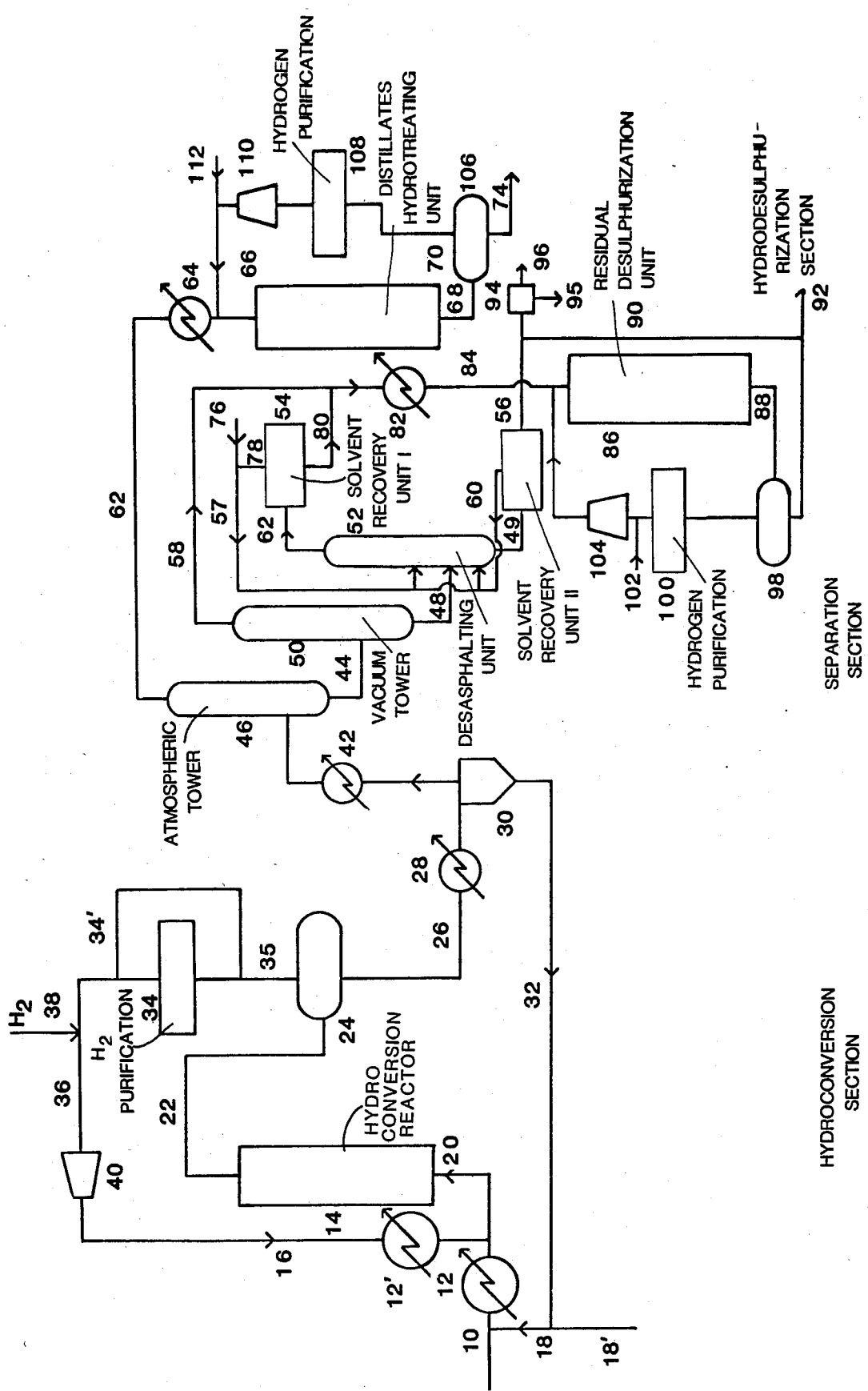
FIG. 1 is a schematic flow diagram showing the sequence of process steps and separation stages which can be employed in an integrated processing embodiment of the present invention.

The present invention, as indicated above, is a process for upgrading heavy petroleum feedstocks, also sometimes called heavy crudes or residual oils. These crudes and oils have high concentrations of metal contaminants and Conradson Carbon residue contents. Typically metal concentrations are present in amounts greater than about 250 ppm of vanadium plus nickel and the Conradson Carbon residue content is greater than about 8%. Atmospheric distillates are usually less than about 20% (v/v) and vacuum gas oil fractions, boiling between about 650° F. and about 1050° F., are less than about 20% (v/v), with reference to those feedstocks. Their API gravity is generally lower than about 20° API and the sulfur concentration is more than about 2% by weight.

The process of this invention comprises a hydroconversion in which the heavy crude feedstock is contacted with hydrogen in the presence of the naturally occurring material of the formula (I) above as a catalyst. This invention can also include a separation procedure and a hydrodesulfurization procedure.

FIG. 1 describes the hydroconversion process of this invention with, additionally, a separation procedure and a hydrodesulfurization procedure.

Hydroconversion

Referring to FIG. 1, the heavy crude oil or its atmospheric or vacuum residue (10) is mixed with catalyst (18) and heated (12), mixed with recycled hydrogen (16) and fed to the hydroconversion reaction zone (14). Flow of the three-phase mixture within the reaction zone may be upwards to better maintain suspension of the catalyst, present in finely divided form, in the liquid/gas stream.

The catalyst is a naturally occurring material of the composition described by the formula (I) above, which is available in large quantities in nature. The broad range and preferred range for chemical and physical properties of the catalyst used in the hydroconversion are shown in Tables 2 and 3 below.

TABLE 2

| | Chemical Composition (% by weight) | | | | | | | | | | |
|---|---|---|---|---|---|---|---|---|---|---|---|
| | Si (as $SiO_2$) | Al ($Al_2O_3$) | Fe ($Fe_2O_3$) | Mg (MgO) | Ti ($TiO_2$) | P ($P_2O_5$) | Mn (MnO) | Ca (CaO) | Ni (NiO) | $H_2O$ | $CO_2$ |
| Broad | 0.4–41.6 | 0.7–55.5 | 10.3–77.0 | 0.5–33.0 | 1.9–5.0 | 0.5–2.0 | 3.0–6.0 | 1.0–5.0 | 1.0–5.0 | 12.2–29.0 | 10.0–40.0 |
| Preferred | 1.0–2.5 | 9.0–31.0 | 45.0–77.0 | 0.5–10.0 | 3.0–5.0 | 0.6–1.4 | 3.0–5.0 | 2.0–4.0 | 2.0–4.0 | 12.2–17.0 | 30.0–38.0 |

TABLE 3

| | Specific Physical Properties | | | | | | | |
|---|---|---|---|---|---|---|---|---|
| | Specific Surface Area, Sg ($m^2/g$) | Specific Pore Volume, Vp ($cm^3/g$) | Average Pore Diameter $\bar{d}$ (Å) | Average Pore Size Distribution, Å, (% of Total) | | | | |
| | | | | r > 1000 | 1000 ≧ r > 100 | 300 ≧ r > 100 | 100 ≧ 4 > 40 | r < 40 |
| As Received | | | | | | | | |
| Broad | 10–100 | 0.01–0.4 | 4–1600 | 5–20 | 5–40 | 5–50 | 10–80 | 20–80 |
| Preferred | 20–50 | 0.05–0.3 | 80–800 | 10–20 | 10–30 | 10–40 | 15–60 | 20–40 |
| After Thermal Treatment | | | | | | | | |
| Broad | 10–200 | 0.10–0.9 | 20–3600 | 5–60 | 5–50 | 5–30 | 6–30 | 4–60 |
| Preferred | 20–150 | 0.20–0.8 | 53–1600 | 20–50 | 10–50 | 8–25 | 6–10 | 4–30 |

Examples of naturally occurring materials of the composition (I) above include iron laterite (($\gamma$FeOOH (1−$\gamma$) $Fe_2O_3$·$nH_2O$ $\alpha$AlO(OH)) $(SiO_2)_x$ $(FeTiO_3)_y$ (Ti- $O_2)_z$ with $\gamma$ much greater than $(-\gamma)$), nickel laterite $(\alpha Mg_3 ((SiO_2)_5 (H_2O)_4) (NiO_2)_x)$, (with laterites available from Los Guaicas Range, Bolivar State (Venezuela); and Easton, Pa. (USA)), limonite $((\gamma Fe_2O_3.nH_2O) (1-\gamma) Fe_3(PO_4)_2.8H_2O \  \alpha Al_2O_3.nH_2O \ (SiO_2)_x$ with $\gamma$ much greater than $(1-\gamma)$), (available from Brasil, Canada, Angola, and Cerro Bolivar (Venezuela)), siderite $((\gamma FeCO_3 \ \alpha CO_3 jCaCo_3) (MnO_2)_x (P_2O_5)_y (SiO_2)_z)$, (available from Pennsylvania (USA) and Mont-Saint Hilaire (Canada)), bauxite $((1-\alpha,\gamma) Al(OH)_3 \ \alpha Al(OH)_3 \ \alpha AlO(OH) \ \gamma Al_2O_3.nH_2O \ \beta FeO(OH) (SiO_2)_x (TiO_2)_y$ with $\alpha$ approximately equal to $\gamma$ or $(1-\alpha)$ Al$_2$O$_3$.nH$_2$O $\alpha$-AlO(OH) $(1-\gamma)$ FeO(OH) $\gamma Fe_2O_3$.mH$_2$O $(SiO_2)_x (TiO_2)_y$ with $\alpha$ greater than $(1-\alpha)$), (available from Guyana, Jamaica and Arkansas (USA)), aluminosilicate clay $(\alpha-Al_2O_3.nH_2O \ \beta FeO(OH).\gamma Mg_3 ((siO_2)_5 (H_2O)_4) (TiO_2)_x (SiO_2)_y (\Delta Al_2O_3.nH_2O) \gamma AlO(OH) \xi Fe_2O_3.mH_2O \ jMg_3 ((SiO_2)_5 (H_2O)_4) (TiO_2)_w (SiO_2)_z)$, etc. These materials are readily and commercially available. The naturally occurring material of the composition described by formula (I) can be used as is or after a thermal treatment at about 400° C. to 1100° C. for about 1 minute to about 4 hours in the presence of air and/or water vapor.

Typical chemical compositions for naturally occurring materials within the scope of the composition of the catalyst of the formula (I) described above are shown in Table 4 below.

TABLE 4

| Element Present | Element Calculated As | Ferruginous Laterite | Nickel containing Laterite | Limonite | Siderite | Aluminosilicate Clay | Bauxite | Iron Pyrite | Iron Sulfide | Hematite | Magnetite |
|---|---|---|---|---|---|---|---|---|---|---|---|
| Si | SiO$_2$, % w | 2.0 | 41.6 | 1.0 | 0.47 | 35.0 | 3.4 | — | — | — | — |
|  | SiO$_2$, % mole (a × 100) | 2.2 | 30.2 | 1.3 | 0.58 | 17.3 | 2.8 | — | — | — | — |
| Al | Al$_2$O$_3$, % w | 30.8 | 0.7 | 9.2 | — | 29.8 | 55.5 | — | — | 2.66 | 0.52 |
|  | Al$_2$O$_3$, % mole (b × 100) | 18.8 | 0.3 | 7.2 | — | 8.8 | 27.3 | — | — | 4.02 | 1.16 |
| Fe | Fe$_2$O$_3$, % w | 45.6 | 10.3 | 77.0 | 52.2 | 31.8 | 16.1 | 100 | 100 | 97.28 | 99.4 |
|  | Fe$_2$O$_3$, % mole (c × 100) | 17.7 | 2.8 | 37.6 | 24.2 | 5.7 | 5.01 | 100 | 100 | 95.11 | 98.01 |
| Mg | MgO, % w | — | 31.3 | — | 4.55 | 0.5 | — | — | — | — | — |
|  | MgO, % mole (d × 100) | — | 34.1 | — | 8.3 | 0.5 | — | — | — | — | — |
| Ti | TiO$_2$, % w | 4.8 | — | — | — | 1.9 | 2.2 | — | — | — | — |
|  | TiO$_2$, % mole (e × 100) | 3.7 | — | — | — | 1.0 | 1.4 | — | — | — | — |
| P | P$_2$O$_5$, % w | — | — | 0.6 | 1.32 | — | — | — | — | — | — |
|  | P$_2$O$_5$, % mole (f × 100) | — | — | 0.4 | 0.69 | — | — | — | — | — | — |
| Mn | MnO, % w | — | — | — | 4.08 | — | — | — | — | — | — |
|  | MnO, % mole (g × 100) | — | — | — | 4.25 | — | — | — | — | — | — |
| Ca | CaO, % w | — | — | — | 2.09 | — | — | — | — | — | — |
|  | CaO, % mole (h × 100) | — | — | — | 2.76 | — | — | — | — | — | — |
| Ni | NiO, % w | — | 3.5 | — | — | — | — | — | — | — | — |
|  | NiO, % mole (i × 100) | — | 2.0 | — | — | — | — | — | — | — | — |
| H$_2$O | H$_2$O, % w | 16.7 | 12.6 | 12.2 | — | 29.0 | 22.8 | — | — | 0.1 | 0.06 |
|  | H$_2$O, % mole (j × 100) | 57.6 | 30.6 | 53.5 | — | 66.7 | 65.5 | — | — | 0.87 | 0.85 |
| CO$_2$ | CO$_2$, % w | — | — | — | 35.27 | — | — | — | — | — | — |
|  | CO$_2$, % mole (k × 100) | — | — | — | 59.3 | — | — | — | — | — | — |
|  | % w, Total | 100.0 | 100.0 | 100.0 | 100.0 | 100.0 | 100.0 | 100.0 | 100.0 | 100.0 | 100.0 |
|  | % mole, Total | 100.0 | 100.0 | 100.0 | 100.0 | 100.0 | 100.0 | 100.0 | 100.0 | 100.0 | 100.0 |
|  | (j + k) (× 100) | 57.6 | 30.6 | 53.5 | 59.3 | 66.7 | 65.5 | 0 | 0 | 0.87 | 0.85 |
|  | (c + g + i) (× 100) | 17.7 | 4.8 | 37.6 | 28.4 | 5.7 | 5.01 | 100 | 100 | 95.1 | 98.0 |
|  | (a + b + d + e + f + h) (× 100) | 24.7 | 64.6 | 8.9 | 12.3 | 27.6 | 31.5 | 0 | 0 | 4.02 | 1.16 |

Typical physical properties of naturally occurring materials as described in Table 4 above after thermal treatment at 800° C. for 4 hours in the presence of air are shown in Table 5 below.

TABLE 5

| | PROPERTIES AFTER THERMAL TREATMENT | | | | | | | | | |
|---|---|---|---|---|---|---|---|---|---|---|
| | | Nickel | | | | | | Comparison Catalysts | | |
| | Ferruginous Laterite | containing Laterite | Limonite | Siderite | Aluminosilicate Clay | Bauxite | Iron Pyrite | Iron Sulfide | Hematite | Magnetite |
| Surface Area, Sg (cm$^2$/g) | 37 | 128 | 28 | 89 | 32 | 80 | 5 | 2 | 3 | 4 |
| Pore Volume, Vp (cm$^3$/g) | 0.29 | 0.37 | 0.50 | 0.50 | 0.25 | 0.52 | 0.02 | 0.008 | 0.01 | 0.01 |
| Average Pore Radius, r̄ r = (2Vp/Sg), Å | 157 | 58 | 357 | 112 | 156 | 130 | 80 | 80 | 66.7 | 50 |
| Distribution of Pore Volume Percentage (%) of Total Pore Volume in Pores of | | | | | | | | | | |

TABLE 5-continued

| | PROPERTIES AFTER THERMAL TREATMENT | | | | | | | | | |
|---|---|---|---|---|---|---|---|---|---|---|
| | | Nickel | | | | | Comparison Catalysts | | | |
| | Ferruginous Laterite | containing Laterite | Li-monite | Siderite | Alumino-silicate Clay | Bauxite | Iron Pyrite | Iron Sulfide | Hema-tite | Mag-netite |
| Radius R (Å) | | | | | | | | | | |
| r > 100 | 36 | 3 | 32 | 10 | 30 | 12 | 0 | 0 | 0 | 0 |
| 1000 ≧ r > 300 | 25 | 3 | 26 | 5 | 20 | 12 | 0 | 0 | 0 | 0 |
| 300 ≧ r > 100 | 21 | 5 | 6 | 6 | 25 | 8 | 3 | 1 | 7 | 2 |
| 100 ≧ 4 ≧ 40 | 14 | 28 | 6 | 20 | 15 | 8 | 2 | 3 | 5 | 2 |
| r < 40 | 4 | 61 | 30 | 59 | 10 | 60 | 95 | 96 | 88 | 96 |

The representative formula (I) is used above for simplicity in describing the naturally occurring catalyst of this invention. Formula (I) shows the composition of the catalyst used in the hydroconversion process of this invention in terms of the elements which can be present in the catalyst. It must be recognized that the metallic element, although set forth in formula (I) above, is not the form present in the catalyst but rather the element in the form of a compound thereof is present. Generally, the element is in the form of the oxide, the sulfide, the carbonate, the sulfite or sulfate, the phosphate, etc., in the catalyst. To clearly define the composition of the catalyst, such is thus described in terms of the amount of the element in the compound calculated in terms of a common oxide form thereof.

For example, iron can commonly exist as $Fe_2O_3$, $FeO$ and $Fe_3O_4$. Thus, by defining the iron content of the catalyst in terms of its calculation as $Fe_2O_3$, such can be defined clearly since regardless of whether the iron is actually present in the catalyst as $Fe_2O_3$, $FeO$ or $Fe_3O_4$. The calculated amount of iron as $Fe_2O_3$, on a molar basis for these oxides is a conversion ratio to $Fe_2O_3$ of 1 to 1, 2 to 1 and 0.67 to 1, respectively. Similarly, if the iron is present as $FeS$, the conversion to $Fe_2O_3$ is a ratio of 2 to 1. Similar molar conversion calculations exist as to the compounds of the other elements present, e.g., for $AlCl_3$ to , the ratio is 2 to 1. Of course, it is not necessary for this conversion to be made for the $H_2O$ and $CO_2$ components of the catalyst used in this invention, so they are defined in the formula (I) above as $H_2O$ and $CO_2$, respectively.

This allows the active components present in the catalyst to be defined clearly in terms of the amounts of the elements present regardless of the actual form, i.e., compound, oxide, sulfide, etc., in which they are present in the catalyst. While not desiring to be bound, it is believed that the active hydrogenation elements of the catalyst are Fe, Ni and Mn, the active acidic elements in the catalyst are Si, Al, Mg, Ti, and P and the porosity forming elements are $H_2O$ and $CO_2$.

For maximum catalytic efficiency and to facilitate the formation of a heavy crude feed/catalyst slurry in the hydroconversion reaction zone, the catalyst should generally be of sufficiently small particle size so as to become suspended in and carried by the heavy crude oil-gas-hydrogen mixture. The catalyst employed during this stage has high porosity, thermal and mechanical stability, and a high selectivity for the conversion of resins and asphaltenes to fractions distilling below about 1050° F. The activity of the catalyst allows a low hydrogen partial pressure inside the reaction zone. Also, the catalyst can be used without expensive forming (i.e., extruding, pelletizing, etc.) or complex activation procedures, i.e., it can be used as is or with a simple thermal treatment. These factors alone have a considerable economic impact on the cost of operating the process and reducing overall capital expenditures as well.

Referring again to FIG. 1, the percent by weight of catalyst entering the reaction zone in line (20) varies between 1 and 15%, depending on the feedstock used, with the preferred value being 1 to 5%, based on the feedstock oil plus catalyst mixture. The particle diameter of the catalyst generally will vary between about 5 and about 2000 microns, according to the required catalyst inventory in the reaction zone. The preferred particle diameter is between 5 and 150 microns.

The hydrocarbon, catalyst, and hydrogen mixture preferably has an ascending movement within the reaction zone. The linear velocity of the liquid inside the reaction zone is between about 3 and 300 feet/hour, the preferred linear velocity being between 15 and 150 feet/hour. The solid content may distribute along the reaction zone center line in accordance with a decreasing logarithmic function. The total space velocity of the liquid inside the reaction zone is from about 0.1 to 100 hours$^{-1}$ and preferably about 0.5 to about 3.5 hours$^{-1}$. The operating temperature in the reaction zone is between about 660° and about 950° F., the preferred operating temperature being between 775° and 875° F. The desirable operating pressure varies from 300 to 3700 psi; the preferred pressure is between 750 and 1500 psi.

At the entrance to the hydroconversion reaction zone (14), the hydrogen/hydrocarbon ratio varies between about 560 and about 30,000 $scfH_2/b$, the preferred ratio being between 6700 and 9000 $scfH_2/b$. Stream (35) which exits from separator (24) has a low hydrogen sulfide concentration. Typical characteristics for this stream are, in percent by volume: $CH_4$: 2.3%; $C_2$: 1.8%; $C_3$: 1.4%; $C_4$: 0.2%; $C_5$: <0.5%; $H_2S$: 0.5%; $H_2$: balance. Because of the low hydrogen sulfide concentration, only a fraction of stream (35) may need to be purified in unit (34). Most of the gas exiting separator (24), between about 60 and about 100% by volume of the total, enters stream (34') and is recycled to the reaction zone without further purification.

Comparison of the inlet and exit concentrations of reaction zone (14) reveals a decrease of not less than 30% in Conradson Carbon residue and metal contaminants in the liquid phase. A more than one hundred-fold decrease in viscosity is also noticed, e.g., from about 20,000 cst (at 140° F.) to about 20 cst as are significant increments in the naphtha distillates and vacuum gas-oil fractions. Typical characteristics for the liquid phase, measured in stream (26), in percent by volume, are IBP-480° F.: 17%; 480°-650° F.: 22.9%; 650°-940° F.: 37.6%; 940° F.+: 22.5%. By contrast, the original heavy feed (10) contained, in percent by volume: IBP-650° F.: 15%; and 650°-1050° F.: 25%.

The mild severity conditions in reaction zone (14) allow a high liquid yield of the upgraded product flowing from separator (24). At 770° F. and typical reaction conditions, when a crude of 12.2° API, 2.7% sulfur, and 10% Conradson Carbon residue is fed, the liquid yield at the outlet of reaction zone (14) is 95% by weight.

As another embodiment of this invention, the heavy crude feed/catalyst slurry may be converted in hydroconversion reaction zone (14) comprising tubes of a visbreaking or thermal cracking furnace, which furnace technology is well-known to those skilled in the art.

In a still-further embodiment of this invention, catalyst particles of size up to about one-half inch, e.g., about one-sixteenth inch to about one-half inch, may be employed in a moving bed reactor, known generally as a "bunker-flow" reactor to those skilled in the art. In this less preferred embodiment, heavy oil and hydrogen are fed to hydroconversion reaction zone (14), and catalyst is fed and withdrawn to provide a slowly moving bed of active catalyst. This embodiment avoids the difficulty of forming and later separating the oil/catalyst slurry, but is a more expensive and complex reactor design than the preferred alternatives described above.

After the hydroconversion reaction process of this invention, the catalyst can then be separated in accordance with a further embodiment of this invention. The catalyst separation can be by using a conventional mechanical device such as a cyclone, centrifuge, or filter. The catalyst can then be recycled totally or partially to the reaction, if desired.

Gas and Catalyst Separation

During this hydroconversion stage, a great reduction in the size of the hydrocarbon molecules takes place, as is evidenced by a significant viscosity drop. A partial demetallization of the crude oil also occurs at this stage.

Considering FIG. 1 as to this aspect, effluent from reaction zone (14) is passed through line (22) to a flash tank (24). In the flash tank, hydrogen and hydrogen sulfide formed in reaction zone (14) are removed from the effluent and pass partially to a conventional purification unit (34), where hydrogen sulfide is separated with a suitable scrubbing solution. The purified hydrogen can be then mixed with a stream of pure hydrogen (38), corresponding to the net hydrogen consumption in reaction zone (14). The combined hydrogen stream can be then compressed (40), heated (12'), and recycled to reaction zone (14).

The liquid/catalyst stream (26) emitting from separator (24) is then cooled (28). This cooling does not geneally result in any phase separation of the stream's hydrocarbon fraction. Due to the mild conditions employed in reaction zone (14) this hydrocarbon fraction is generally composed of only one totally compatible phase. The stream passes to a mechanical separator device (30), where a large fraction of the catalyst is separated in the under flow. Mechanical device (30) may be a filter, centrifuge, cyclone, or any other suitable device. FIG. 1 indicates a hydraulic cyclone for this purpose, which allows the catalyst to be recycled to the hydroconversion reaction zone (14) in the form of a slurry containing between about 5 and about 30% by weight of catalyst, based on the weight of the oil. The overflow of separator (30) contains suspended catalyst fines, its mass flow being from about 10 to about 25% of the net amount of catalyst introduced to reaction zone (14) in stream (20). Since as shown in FIG. 1 the catalyst fines are not recycled, the amount of fresh catalyst added (18') is identical to the mass flow of fines in the overflow of separator (30).

As indicated above, the catalyst in stream (26) can be separated physically by any mechanical device (30) such as a hydraulic cyclone, filter, centrifuge, decanter, centrifugal decanter, etc. The catalyst can also be separated in a later deasphalting stage, described below, where the catalyst comes out mixed with the asphalt fraction. After filtering this asphalt fraction, the catalyst can be recovered and recycled to reaction zone (14) with or without previous thermal regeneration or combustion in air of the catalyst. A low-temperature filtering stage can be used where the catalyst is removed from the filter as a slurry containing about 25 to 60% by weight of solid. The liquid is separated with a solid content lower than about 0.01% by weight. Alternatively, the catalyst can be separated during the asphaltene precipitation stage, described hereinbelow, using paraffinic hydrocarbons. A preferred method of separation, however, is with the use of mechanical separation means.

Regeneration of the catalyst prior to recycle is preferred. Since vanadium present originally in the feedstock accumulates on the catalyst used, recycling of and use of regenerated hydroconversion catalyst containing a vanadium to iron molar ratio of less than about 5.0:1 and a molar ratio of vanadium to $Al_2O_3$ plus $SiO_2$ of less than about 20:1 is advantageous.

The above details merely exemplify preferred additional aspects in which the process of this invention can be used and should not be construed as limitations on the scope of the invention.

Hydroconversion Effluent Distillation

The overflow of the catalyst separator (30) can be heated (42) to approximately 600° F. and fractionated, using techniques well known in the art, in an atmospheric tower (46) and a vacuum tower (50). In this procedure, the distillates are hydrodesulfurized in a distillate hydrotreating reaction zone (66), described below.

Distillate Hydrodesulfurization

The hydrotreating (or hydrodesulfurization, used interchangeably herein) proceeds at moderate temperature and pressure, i.e., 650° to 750° F. and 100 to 2000 psi in hydrodesulfurization reaction zone (66). This reaction zone is conventional in nature and is essentially a fixed bed reaction zone containing a conventional hydrodesulfurization catalyst, such as Group VIb or Group VIII metal on an alumina support. These catalysts are well known to those skilled in the art and as a result need not be described in detail herein. A conventional hydrogen to feedstock recycle ratio can be employed, e.g., between about 4,000 and about 10,000 scf$H_2$/b. This value depends on the particular means employed for dissipating the energy produced in saturating olefin bonds which are present in the distillate fraction, and in sulfur removal. The LHSV is between about 0.5 and about 3h$^{-1}$.

Effluent from reaction zone (66) enters a conventional separator (70) where the gaseous products are separated from the liquid. These gaseous products may be sent to a hydrogen purification unit (108) comprising an amine absorber or other device conventionally employed for this purpose. The purified hydrogen can be recompressed (110) and recycled to reaction zone (66)

together with fresh hydrogen (112) equal to the amount consumed in reaction zone (66) previously.

A vacuum gas-oil fraction boiling at about 600°–950° F. (stream 58) is obtained from the top of the vacuum tower (50). A typical absolute pressure in the flash zone of the vacuum tower is in the range of about 5 to about 20 mm Hg, which allows a high yield of the vacuum gas-oil fraction without coke formation in the vacuum bottoms.

Deasphalting

The vacuum bottoms (stream 48) can be deasphalted in a deasphalting column (52). Different solvents may be used for deasphalting the vacuum bottoms, such as light paraffins, e.g., butane, pentane, isopentane, hexane, or a mixture thereof. Autogenerated naphtha, i.e., the 230°–410° F. fraction separated from stream (74) generated in this process, may also be employed as the solvent. The use of this autogenerated naphtha as the deasphalting agent in unit (52) is a preferred feature when deasphalting is a procedure employed with the process of this invention.

The particular equipment used in the deasphalting stage may be a system of mixer-settlers, a rotating disk contactor (RDC) unit, or other mechanical device well known in the art. The solvent to oil weight ratio is typically between about 4:1 and about 1:1 by weight, the preferred ratio being 1.5:1 to 2.5:1. The temperature and pressure may range from about 80° to about 390° F. and from about 15 to about 900 psi, respectively, depending on the solvent and feedstock employed as well as the purpose of this stage.

The deasphalted oil dissolved in the deasphalting solvent is shown in FIG. 1 as stream (62). The solvent is evaporated and stripped from the oil in solvent recovery unit I (54). The solvent is then recycled to the deasphalting unit (52). The same procedure is followed with stream (49) formed by the asphalt mixed with the deasphalting solvent, except that in this case the solvent is recovered in solvent recovery unit II (56). The solvent recovered here can also be recycled to unit (52) via line (60). Fresh solvent, in stream (76), replaces all that is lost to the system due to absorption in the deasphalted oil or the asphalt.

As previously indicated, the asphalt may contain catalyst fines not separated in the underflow of separator (30) in the separation described above. This asphalt, after exiting solvent recovery unit II (56), may be diluted with not more than about 40% its weight by stream (90), which is a fraction of stream (92) and mainly is a gas-oil 600° F.+ with only 10% of vacuum residuum 950° F.+, to reduce the viscosity of the asphalt. This allows the asphalt stream to be pumped and filtered, in filter (94), where catalyst fines can be separated and discarded (95). Filtered stream (96) has an intermediate sulfur content, e.g., between about 2 and by weight, and low enough viscosity to be easily pumped and burned in boilers of the refinery or elsewhere for heat generation. For example, when the oil production field is nearby, slream (96) can be burned to produce steam for well stimulation.

Residual Hydrodesulfurization

Deasphalted oil (80), after exiting solvent reoovery unit I (54), is heated (82) and mixed with recycled hydrogen. The stream enters a fixed-bed residual desulfurization unit (86). Typically this stream contains between about 10 and about 150 ppm of V+Ni, depending on the feedstock, conditions ln reaction zone (14), and deasphalting solvent, etc.

The catalyst beds in reaction zone (86), preferably, involve a particular arrangement of the desulfurizing catalyst in order to attain long catalyst life. The arrangement preferred when desulfurization is employed with the process of this invention is indicated in Table 6, below.

TABLE 6

| First Catalytic Bed Catalyst Properties, Chemical Composition (weight percent) | | | | | |
|---|---|---|---|---|---|
| $MoO_3$ | NiO | CoO | $Al_2O_3$ | Group VIB Metal | Group VIII Metal |
| — | — | — | Balance | 0–10 | 0–8 |
| 0–20 | 0–8 | 0–8 | Balance | — | — |

| First Catalytic Bed Catalyst Physical Properties | | | | | |
|---|---|---|---|---|---|
| Particle Diameter (mm) | Surface Area ($m^2/g$) | Pore Volume ($cm^3/g$) | Distribution of Pore Volume (Percent) | | |
| | | | $0 \leq r \leq 50\text{Å}$ | $50 \leq r \leq 100\text{Å}$ | $r \geq 100\text{Å}$ |
| 1–10 | 50–300 | 0.4–1.4 | 0–40 | 0–50 | 0–50 |
| 3–5 | 100–200 | 0.4–1 | 10–40 | 10–40 | 20–40 |

| Second Catalytic Bed Catalyst Properties, Chemical Composition (weight percent) | | | | | |
|---|---|---|---|---|---|
| $MoO_3$ | NiO | CoO | $Al_2O_3$ | Group VIB Metal | Group VIII Metal |
| — | — | — | Balance | 0–10 | 0–8 |
| 0–20 | 0–8 | 0–8 | Balance | — | — |

| Second Catalytic Bed Catalyst Physical Properties | | | | | |
|---|---|---|---|---|---|
| Particle Diameter (mm) | Surface Area ($m^2/g$) | Pore Volume ($cm^3/g$) | Distribution of Pore Volume (Percent) | | |
| | | | $0 \leq r \leq 30\text{Å}$ | $30 \leq r \leq 100\text{Å}$ | $r \geq 100\text{Å}$ |
| 0.1–5 | 50–300 | 0.3–1.2 | 20–50 | 20–40 | 20–40 |
| 1–3 | 40–150 | 0.3–1.0 | 20–40 | 20–30 | 20–30 |

The desulfurization catalysts described in Table 6 can be prepared by successive impregnations of Group VIB and VIII metals onto macroporous alumina carriers where about 20% of the pore volume is larger than 100

Å. The soluble salt of the Group VIB metal is contacted with the carrier for a period of time between about 0 and 24 hours, preferably 1 to 5 hours. The impregnated material is then dried at about 170° to about 250° F. and calcined at about 750° to 1100° F., preferably 840° to 1010° F. The calcined catalyst is then contacted with a solution of one or more Group VIII metals for about 0.2 to about 5% hours, preferably from 0.5 to 1 hour. The material is dried at about 170° to about 250° F., and activated at a temperature of about 750° to about 1100° F., preferably 840° to 1020° F. The preferred final composition is indicated in Table 6 above for catalysts MoNiCo/Al$_2$O$_3$. The physical properties of the first and second catalytic beds are described in Table 6 above. The first catalyst has a larger average pore diameter than the second catalyst. Both catalytic beds may be arranged in series in the same reaction zone, or separate reaction zones arranged in series may be used. The hydrocarbon and hydrogen preferably follow a descending path through the first and second catalytic beds.

The operating pressure and temperature in unit (86) vary between about 200 and about 3000 psi and about 660 and about 840° F., more preferably between 740 and 2200 psi and 690 and 800° F., respectively. The hydrogen to hydrocarbon ratio varies between about 700 and about 11,200 scf/b, preferably between 1000 and 8500 scf/b. LHSV used is between about 0.2 and about 1.0 h$^{-1}$ with an average residence time in the desulfurizing reaction zone of about 0.5 to about 3.5 hours. The average linear velocity of the liquid in the reaction zone varies between about 15 and about 150 feet/hour, preferably between 30 and 60 feet/hour. If two reaction zones are employed, the temperature and pressure of the second reaction zones is essentially the same as those specified for the first reaction zone. The temperature and linear velocity of the liquid in the second reaction zone are essentially the same as those specified for the first reaction zone. When desulfurization is used with the present invention, the procedure is not limited to the use of one or two reaction zones, or to one or two catalysts, but to an arrangement of one or more catalysts and one or more reaction zones in accordance with the final specifications of the products and the required catalyst life cycle.

Gaseous effluents from reaction zone (86) are separated (98) and hydrogen therein purified in unit (100) the hydrogen then can be mixed with pure hydrogen in an amount consumed in that reaction zone (102). In this, the stream is recompressed to its inlet pressure and then joins the hydrocarbon stream (84) which enters the residual desulfurization reaction zone.

Typically, only from about 20 to about 30% by volume of the heavy crude introduced into the sequence of this invention (stream 10) needs to be deasphalted. In accordance with this invention, if the severity of conditions in hydroconversion reaction zone (14) are high enough, and the vacuum bottoms (48) are about 15% or less by volume of stream (10), an integrated process involving a deasphalting stage would not be considered for use in this invention. In this situation, vacuum bottoms (48), after being filtered (94), can be used directly as refinery fuel or for steam production.

Similarly, catalyst recycling may be partial or eliminated totally. In this latter event, separator (30) may not be employed and all of the catalyst may be recovered in stream (95) after filtering.

The final product is a mixture of streams (92) and (74). When feedstock (10) is a crude of 12.2° API, 2.7% sulfur, 10% Conradson Carbon residue, 8.2% asphaltenes, and 400 ppm V+Ni, the final product is a vastly upgraded crude of 25° API, 0.2% sulfur, less than 10 ppm V+Ni. This product is quite suitable for use in motor fuel production in a conventional refinery.

The practice of this invention is demonstrated further by reference to the following examples which are provided for the purpose of illustration and are not to be construed as limiting the invention.

Unless otherwise indicated herein, all parts, percents, ratios and the like are by weight.

EXAMPLES 1-3

Jobo crude was hydroconverted and upgraded in a continuous pilot plant using the process of this invention as illustrated in Example 1. Examples 2 and 3 exemplify an integrated embodiment of this invention where deasphalting and desulfurizing of product obtained from the hydroconversion in Example 1 are employed additionally.

Example 1

Conditions in the hydroconversion reaction zone (similar to (14) in FIG. 1) were as follows: pressure: 1000 psig; temperature: 751° F.; space velocity: 0.9 h$^{-1}$; catalyst employed: ferruginous laterite of chemical composition Fe: 25.0%; Al: 20%; Si: 2%; Ti: 3%; specific surface area: 60 m$^2$/g; pore volume: 0.4 cm$^3$/g; distribution of pore volume: (0<r<10 Å): 40%; (0<r<100 Å)): 14%; (r>100 Å): 46%; catalyst activated in air at 1470° F. for one hour; particle diameter: 100% from 75 to 150 microns; catalyst/heavy crude ratio: 5%; hydrogen purity at reaction zone entrance: 90%(v/v); solids hold-up in the reaction zone: 20%(w/w); liquid linear velocity: 0.025 cm/sec. gas linear velocity: 5 cm/sec.

After leaving the reaction zone the oil-catalyst slurry filtered in continuous filter with a sieve opening of 30 microns. Ninety percent of the catalyst was separated.

The volumetric yield of the liquid product was 99.3% (v/v) with reference to the raw heavy crude fed. Some of the characteristics of this product were: vanadium, 200 ppm; sulfur, 2.2%; asphaltenes, 5.8%; Conradson Carbon content 8%, as shown in Table 7 below.

Example 2

The hydroconverted product obtained as described in Example 1 above was deasphalted using n-hexane as a solvent. The solvent to hydroconverted product feed ratio was 4:1, the temperature was 86° F., and the pressure was ambient.

The yield of deasphalted oil (hereinafter "DAO") was 92.5% (v/v) with reference to raw Jobo crude fed to the hydroconversion reaction zone. The characteristics of this deasphalted oil are also shown in Table 7, below (sulfur: 2.1%; vanadium: 63 ppm; nitrogen: 3160 ppm; asphaltenes: 0.53%; Conradson Carbon: 4.57%). The characteristics of the asphaltenes produced are also shown in Table 7 below.

Example 3

The DAO produced as in Example 2 above was hydrotreated in a trickle-bed reaction zone under the following operating conditions: temperature: 752° F.; pressure: 1500 psig; space velocity: 0.72 h$^{-1}$; hydrogen to DAO feed ratio: 8000 scf/b; average linear velocity: 15 ft/h.

The catalyst employed in the DAO hydrodesulfurization was prepared by double impregnation of a microporous alumina support first with molybdenum and then with cobalt. The impregnated catalyst was dried and calcined for one hour at 932° F. The final molybdenum and cobalt content on the catalyst were 10% and 2.5% (w/w), respectively. The resulting catalyst had the following physical characteristics: specific surface area: 210 m²/g; pore volume: 0.64 cm³/g: distribution of pore volume: ($0 < r < 30$ Å): 50%; ($30 < r < 100$ Å): 32%; ($r > 100$ Å): 18%.

Table 7 below includes also characteristics of the desulfurized product obtained. Some of these are: °API, 27.4; sulfur, 0.13%; vanadium, 10 ppm; nitrogen, 1160 ppm. The volumetric yield of the desulfurized synthetic crude, on raw Jobo crude, fed to the hydroconversion reaction zone was 94.9%.

After distilling this desulfurized product the following fractions distribution was obtained: IBP-430° F., 14% (v/v); 430°-650° F.; 28%; 650°-1050° F., 49%; 1050° F.+: 9%.

catalyst particle diameter was 100% between 10 and 30 microns.

The portion of the catalyst recycled to the hydroconversion reaction zone was 80% of the total amount of catalyst entering the reaction zone (14) through line (20).

At the exit of the reaction zone the liquid stream passed through a hot separator, which operated at 752° F. and 900 psig. Hydroconverted liquid product from the underflow from the hot separator had the characteristics set forth in Table 8 below.

EXAMPLE 5

After cooling, the liquid product from the underflow of the hot separator, obtained as described in Example 4 above. was fed to a deasphalting unit ((52) in FIG. 1). The gas stream from the top of the separator was cooled and separated in a cold separator, which was operated at 140° F. and 880 psig.

The gas stream from the top of the cold separator was 85% (V/v) hydrogen. The liquid stream coming out as the underflow was hydrotreated in a unit similar to (66) in FIG. 1, as later described.

TABLE 7

CHARGE PROPERTIES AND PRODUCT CHARACTERISTICS

| PRODUCT PROPERTY | FEED CRUDE | Example 1 PRODUCT FROM HYDROCONVERSION REACTOR | Example 2 DE-ASPHALTING | Example 2 AS-PHALTENES* | Example 3 DESULFURIZED PRODUCT |
|---|---|---|---|---|---|
| Yield W/W %** | 100 | 96.6 | 91.5 | 8 | 97 |
| Yield W/W %*** | 100 | 96.6 | 88.4 | 7.7 | 85.75 |
| Yield V/V %*** | 100 | 99.3 | 92.3 | — | 94.9 |
| Gravity °API | 12 | 16 | 18.3 | — | 27.4 |
| Sulfur (%) | 2.93 | 2.20 | 2.1 | 3.5 | 0.13 |
| Vanadium (ppm) | 360 | 220 | 63 | 1573 | 10 |
| Conradson Carbon (%) | 12.5 | 8.0 | 4.57 | — | 0.77 |
| Asphaltenes (%)* | 9.22 | 5.8 | 0.53 | — | 0.18 |
| Nitrogen (ppm) | 5830 | 3800 | 3160 | — | 1160 |
| Viscosity 140° F. (cst) | 880 | 64.6 | 31.22 | — | 9.04 |
| Viscosity 210° F. (cst) | 68 | — | 9.23 | — | 3.04 |
| Dropping Point (°F.) | — | — | — | 415 | — |

*Insolubles in Hexane
**Stage yield
***Yield with respect to crude feed

EXAMPLES 4–6

Raw Morichal crude having the characteristics shown in Table 8 below was upgraded using the process of this invention as in Example 4, and an integrated embodiment is shown by deasphalting and desulfurization in Examples 5 and 6, respectively.

Example 4

The hydroconversion reaction zone (14 in FIG. 1) was operated under the following conditions: catalyst/heavy crude oil, 3.5% (w/w) ratio; hydrogen/heavy crude oil ratio, 13000 scf/b; recycle hydrogen purity, 80% (v/v); linear liquid velocity 0.02 cm/sec; linear gas velocity, 5 cm/sec.; reaction temperature and pressure, 788° F. and 1000 psig respectively; space velocity, 0.7 h⁻¹. The catalyst hold-up in the reaction zone was 15% (w/w).

The catalyst employed was a nickel containing laterite of the composition Al: 1%; Fe: 8%; Si: 20%; Mg: 20%; Ni: 2.8%. The catalyst had the following characteristics: specific surface area: 128 m²/g; pore volume: 0.36 cm³/g; distribution of pore volume Vp ($0 < r < 10$ Å): 60%; ($10 < r < 100$ Å): 20%; ($r > 100$ Å): 20%. This catalyst was activated in air at 932° F. for one hour. The Liquid underflow from the hot separator (50% w/w based on raw Morichal crude) was mixed with n-pentane as a solvent and fed to the deasphalting unit. The n-pentane solvent was added in two streams: 70% of the total added solvent was mixed with the oil and 30% was injected at ⅓ the length of the contacting solumn, measured from the column bottom. A 4:1 solvent/oil ratio by volume was employed. The deasphalter operated at 260° F. and 300 psig.

The asphalt stream ((49) in FIG. 1) was diluted with 40% its weight with the desulfurized heavy product (stream (90) in FIG. 1) and fed to a liquid cyclone, which was operated at 200° F. and 230 psig with a pressure drop through it of 60 psig. The cyclone overflow was flash distilled to recover the n-pentane solvent and filtered through a screen of 10 micron opening to capture the catalyst not being recycled.

The characteristics of the dried asphaltenes (free of hexane solubles) are shown in Table 8 below.

The deasphalted oil, when stripped from the n-pentane, had the characteristics set forth in Table 8 below. Of particular note is the low vanadium content of only 15 ppm. The yield of the deasphalting stage was 92.2% (w/w). The deasphalted oil yield with regard to the raw crude was 46.1% (w/w).

EXAMPLE 6

The deasphalted oil obtained as described in Example 5 above was hydrodesulfurized in an arrangement of fixed beds, similar to (86) in FIG. 1. For this purpose two fixed beds in only one reaction zone were used. The bed placed in the upper portion of the reaction zone was a molybdenum nickel catalyst prepared by successive impregnation of a macroporous alumina, and the catalyst had a content of $MoO_3$ and 3.5% NiO. The catalyst had a surface area of 180 m$^2$/g, a pore volume of 0.8 cm$^3$/g; and a pore volume distribution Vp of (0<r<30 Å): 30% (30<r<100 Å): 40%; (r>100 Å): 40%.

The catalyst in the lower portion of the reaction zone and underneath the catalyst described above was prepared by repeated impregnation of a meso-macroporous alumina with molybdenum and cobalt. Final characteristics of the catalyst were: 12% $MoO_3$; 3% CoO and a specific surface area of 210 m$^2$/g; a pore volume of 0.6 cm$^3$/g; and a pore volume distribution Vp of (0<r<10 Å): 40%; (10<r<100 Å): 40% (r>100Å): 20%.

The desulfurization operating conditions were 752° F., 1500 psig total pressure, and a liquid space velocity of 0.4 h$^{-1}$.

Liquid downflow from the cold separator had the following composition IBP-420° F.: 40% (v/v) 420° F.-650° F.: 54% (v/v); 650°-950° F.: 6% (v/v). This stream was hydrotreated employing a NiMo on alumina catalyst at 752° F. and 1500 psig. The LHSV was equal to 0.75 h$^{-1}$; the hydrogen to oil ratio was 6000 scf/b; and the linear velocity of the liquid phase was 10 ft/h.

Both desulfurized streams, when mixed, resulted in the Syncrude Product whose characteristics are shown in Table 8 below. The total hydrogen consumption was 1050 scf/b. All distillate fractions met usual specifications for feedstocks employed, in conventional refineries, for motor fuel production.

EXAMPLE 7

In order to demonstrate the effect of the natural, easily available catalysts on the performance of the hydroconversion reaction zone ((14) in FIG. 1), the following tests were performed in a pilot plant.

Two catalysts, nickel containing laterite and ferruginous laterite, were used. Their compositions were the same as those employed in Examples 1-3 and 4-6. Two crude oils, Jobo and Morichal from the Orinoco Oil Belt, were used as heavy crude oil feedstocks. The characteristics of these crude oils are presented in Tables 7 and 8 above. The experimental conditions used in the pilot plant were as follows: temperature, 752° F.; and 788° F.; pressure 1500 psig; space velocity: 1.2 h$^{-1}$. Other conditions were similar to those described in Example 1.

The results are set out in Tables 9 and 10 below.

TABLE 9

HYDROCONVERSION OF MORICHAL AND JOBO CRUDES COMPARISON OF YIELDS FOR CATALYST ADDITION AND WITHOUT CATALYST

|  | Temperature (°F.) | Liquid Yield (%) | Gas Yield (%) | Coke Yield (%) |
|---|---|---|---|---|
| | | Jobo Crude Oil | | |
| No catalyst | 752 | 90.9 | 9.1 | — |
| Nickel-containing laterite | 752 | 94.2 | 5.0 | — |
| R* | | 1.04 | 0.55 | — |
| No catalyst | 788 | 80.8 | 14.0 | 4.7 |
| Nickel-containing laterite | 788 | 91.4 | 7.4 | 1.3 |
| R* | | 1.13 | 0.51 | 0.27 |
| | | Morichal Crude Oil | | |
| No catalyst | 752 | 93.9 | 5.7 | 0.4 |
| Ferruginous laterite | 752 | 96.5 | 2.8 | 0.5 |
| R* | | 1.03 | 0.49 | 1.25 |
| No catalyst | 788 | 90.6 | 12.2 | 7.3 |
| Ferruginous laterite | 788 | 92.5 | 6.7 | 0.8 |
| R* | | 1.15 | 0.55 | 0.11 |

R*: Yields ratio with/without catalyst addition.

TABLE 8

CHARACTERISTICS OF MORICHAL CRUDE OIL FEED AND PRODUCTS OBTAINED

| CHARACTERISTICS | MORICHAL CRUDE OIL (392° F.+) | Example 4 | | Example 5 | | Example 6 SYNCRUDE PRODUCT |
|---|---|---|---|---|---|---|
| | | PRODUCT FROM HYDROCON-VERSION REACTOR | LIQUID STREAM FROM HOT SEPARATOR | DEAS-PHALTED OIL | AS-PHALT-ENES | |
| Stage Yield (w/w) % | 100 | 93.0 | — | 92.2 | 8.00 | 96 |
| Yield with Reference to Crude (w/w) % | 100 | 93.0 | 50 | 46.10 | 40 | 85 |
| Gravity, API° | 12.4 | 17.5 | 12.5 | 13 | — | 26 |
| Sulfur (%) | 2.90 | 1.98 | 2.6 | 2.31 | 3.00 | 0.08 |
| Vanadium (ppm) | 380 | 190 | 353 | 15 | 4053 | 5 |
| Nitrogen (ppm) | 5880 | 3400 | 4200 | 3100 | — | 850 |
| Asphaltenes (%) | 9.3 | 4.3 | 8.0 | 0.15 | — | <0.1 |
| Viscosity (210° F.) (cst) | 70 | — | 16.5 | 16.0 | — | 2.5 |
| Dropping point °F. | — | — | — | — | 400 | — |

TABLE 10

HYDROCONVERSION OF MORICHAL AND JOBO CRUDES % CHANGE OF CRITICAL CHARACTERISTICS WITH AND WITHOUT CATALYST ADDITION

|  | Temperature | % Change API | % Change Sulfur | % Change Vanadium | % Change Asphaltenes |
|---|---|---|---|---|---|
| | | Jobo Crude Oil | | | |
| No catalyst | 752 | 7.9 | 8.5 | 4.4 | 1.0 |
| Nickel-containing laterite | 752 | 13.8 | 13.1 | 32.5 | 28.0 |
| R* | | 1.75 | 1.54 | 7.39 | 28.0 |
| No catalyst | 788 | 41.3 | 29.1 | 63.1 | 52.0 |

TABLE 10-continued
HYDROCONVERSION OF MORICHAL AND JOBO CRUDES
% CHANGE OF CRITICAL CHARACTERISTICS
WITH AND WITHOUT CATALYST ADDITION

| | Temperature | % Change API | % Change Sulfur | % Change Vanadium | % Change Asphaltenes |
|---|---|---|---|---|---|
| Nickel-containing laterite | 788 | 52.1 | 27.8 | 59.9 | 38.0 |
| R* | | 1.26 | 0.96 | 0.95 | 0.75 |
| | | Morichal Crude Oil | | | |
| No catalyst | 752 | 16.2 | 9.6 | 1.5 | — |
| Ferruginous laterite | 752 | 17.1 | 14.2 | 23.5 | 37.7 |
| R* | | 1.06 | 1.48 | 15.7 | — |
| No catalyst | 788 | 36.8 | 22.7 | 39.9 | 32.2 |
| Ferruginous laterite | 788 | 46.2 | 28.4 | 57.3 | 45.8 |
| R* | | 1.26 | 1.25 | 1.44 | 1.40 |

R*: Ratio of the % change of critical characteristics with/without catalyst addition.

The results in Table 9 above show that the amount of gas and coke produced is lower when catalyst addition occurs than for the "no catalyst" case. Similarly, the distillates yield is higher when catalyst is used.

The results in Table 10 above demonstrate that, at lower reaction temperatures, the percentage change of critical characteristics of the hydrocarbon (°API and sulfur, vanadium and asphaltene contents) are larger when a catalyst is used than for the "no catalyst" case.

At higher reaction temperatures (788° F.) the increase in coke formation gives rise to more asphaltenes conversion with increased sulfur and vanadium removal. In most cases, the ratio with catalyst addition/without catalyst addition, shown as R*, favors catalytic contacting.

EXAMPLES 8-10

The process of this invention was demonstrated for a period of 700 hours of continuous operation in the hydroconversion reaction zone ((14) in FIG. 1) in Example 8. The product was also fractionated, deasphalted and hydrodesulfurized as indicated in the description hereinabove, as shown in Examples 9 and 10, for an integrated process embodiment of this invention.

EXAMPLE 8

The hydroconversion reaction zone (14) comprised a tube 31 mm ID and 5'6" long, wall heated by means of electric furnaces. The reaction zone was provided with a central thermowell ¼" OD. Hydrogen was preheated to 824° F. outside the reaction zone.

The conditions in the reaction zone were: hydrogen pressure: 1000 psig; temperature: 770° F.; flow upwards of hydrocarbon. and hydrogen mixture; LHSV (of liquid hydrocarbon): 0.5 h$^{-1}$; catalyst concentration in slurry: 5% (w/w); hydrogen recycle: 11000 scf/b of oil. The flow rate of liquid hydrocarbon was 0.63 l/h.

The catalyst employed was an iron containing natural laterite, as described in Example 1. The particle size range of the catalyst was 100% between 5 and 50 microns.

Table 11 below shows the characteristics of the liquid heavy crude oil, which was Morichal crude (12°API), fed and the various fractions obtained.

Six equally spaced thermocouples were placed in the central thermowell and on the reaction zone walls. During the operation, the maximum measured temperature differences between temperatures at the wall and inside the reaction zone were 25° F. Gas entered the reaction zone through a conical gas sparger placed at the reaction zone bottom. A tube, through which solid suspended in the liquid was introduced, was placed at the center of the sparger.

FIGS. 2 and 3 show the main characteristics, indicating API gravity, viscosity, sulfur, vanadium, Conradson Carbon residue, and asphaltene content in the product of hydroconversion reaction zone as a function of time. For comparison, the corresponding values of each characteristic, in the feed to the reaction zone, are also shown.

It can been seen, from FIGS. 2 and 3, that a steady-state is quickly achieved. The average characteristics of the product were 16° API, 2.1% sulfur, 160 ppm vanadium, 8.7% Conradson Carbon, 5% of asphaltenes, and viscosity of 35 cst (140° F.), as shown in Table 12 below. Comparing these data to those of the feed, as shown in Table 11 below, it is seen that 50% demetallization, 24% desulfurization and 42% asphaltene conversion were achieved.

The average hydrogen consumption was around 400 scf/b.

A total mass balance was performed for the long test run, and 94.2% (w/w) of liquid yield was obtained, the difference from 100% being gaseous products.

During the test no increase in pressure drop through the reaction zone was detected. The pressure drop between the entrance to the gas preheater and the exit of the reaction zone was 10 psi. When the reaction zone was opened at the end of the run, after 700 hours of operation, the reaction zone walls were totally clean, without any coke deposits.

Table 12 below shows the characteristics of the fractions in the product of the hydroconversion reaction zone. From a comparison of the values in Tables 11 and 12, and complete distillation curves of both the feed and product streams (not shown), a 70% conversion of the 1050° F.+ bottoms of Morichal crude into distillates fractions can be observed.

Fresh catalyst fed to the reaction zone had a pore volume of 0.67 cm$^3$/g and surface area of 43 m$^2$/g. At the outlet of the reaction zone these values were 0.41 cm$^3$/g and 26 m$^2$/g, respectively. The amount of coke deposit on the catalyst 4.5%. These data indicated that considerable activity was left in the catalyst after one cycle and that the used laterite catalyst could be recycled to the hydroconversion reaction zone (14) without previous combustion in air of the carbonaceous deposits on the catalyst.

In most of the long test run, there was no catalyst recycling, but from day 21 to day 23 catalyst recycling was employed. For this purpose the spended catalyst in the product was recovered by filtration (separator (30) in FIG. 1) through a filter of 10 microns of nominal opening, burnt in air for one hour at 1472° F., and recycled to the entrance of reaction zone (14). During these two days no fresh catalyst was added. From FIGS. 2 and 3 it can be observed that little or no change in the reaction zone performance occurred when the used catalyst was recycled.

Table 14 shows the conditions at which hydrodesulphurization of deasphalted oil was performed as well as the quality of the product obtained.

This operation paralleled that in the residual desulphurization unit (86), FIG. 1.

TABLE 11
CHARACTERISTICS OF MORICHAL CRUDE (12° API)

| | |
|---|---|
| °API | 12.3 |
| Sulfur, % w/w | 2.8 |
| Vanadium, ppm | 312 |
| % Conradson Carbon | 11.1 |
| Asphaltenes, % | 8.74 |
| Viscosity (140° F.), cst | 476 |
| Nitrogen, ppm | 4500 |

| Characteristic | Fraction 425° F.–650° F. | Fraction 650° F.–1050° F. | Fraction 1050° F.+ |
|---|---|---|---|
| Yield, % v/v | 16.7 | 25.8 | 55.8 |
| °API | 29.6 | 18.7 | 4 |
| Nitrogen, ppm | 120 | — | — |
| Sulfur % w/w | 1.12 | 2.42 | 3.96 |
| Viscosity, cst. | 3.9 (100° F.) | 52.6 (100° F.) | 17,127 (212° F.) |
| Conradson Carbon % | — | 0.19 | 23.6 |

TABLE 13
CHARACTERISTICS OF CATALYST EMPLOYED IN HYDRODESULFURIZATION OF DAO

| Composition | CoO: 4.83%; MoO$_3$: 12.82%; Al$_2$O$_3$: Bal. | |
|---|---|---|
| Physical Properties | | |
| Extrudate | 0.76 mm × 3.36 mm | |
| Surface Area: | 259 m$^2$/g | |
| Pore Volume: | 0.95 cm$^3$/g | |
| Average Pore Diameter: | 147Å | |
| Pore Size Distribution: | Vp | % |
| Diameter 20–30Å | — | — |
| 30–60Å | — | — |
| 60–90Å | 0.063 | 7 |
| 90–150Å | 0.581 | 61 |
| 150–300Å | 0.105 | 11 |
| 300–1000Å | 0.072 | 8 |
| 10$^3$–10$^4$Å | 0.136 | 14 |
| Bed Apparent Density | 0.75 g/cm$^3$ | |
| Catalyst Apparent Density | 0.83 g/cm$^3$ | |
| BCS*, Kgf/cm$^2$ | 9.0 | |

*Bulk Crushing Strength

TABLE 12
CHARACTERISTICS OF THE PRODUCT OF HYDROCONVERSION

| Characteristic | Fraction IBP–480° F. | Fraction 480° F.–650° F. | Fraction 650°F.–940° F. | Fraction 940° F.+ | Av. Char. of Hydroconversion Product |
|---|---|---|---|---|---|
| Yield, % w/w | 15 | 21.5 | 37.5 | 26 | — |
| Yield, % v/v | 17 | 22.9 | 37.6 | 22.5 | — |
| °API | 31.2 | 26.2 | 16.8 | 0.7 | 16 |
| Sulfur | 0.88 | 1.49 | 1.88 | 2.77 | 2.1 |
| Bromine No. | 21 | 17 | 16 | — | — |
| Conradson Carbon % | — | — | 0.44 | — | 8.7 |
| Vanadium, ppm | — | — | — | 500 | 160 |
| Viscosity, cst | — | — | — | 40,000 (210° F.) | 35 (140° F.) |
| Asphaltenes, % | — | — | — | — | 5.0 |

EXAMPLE 9

The product obtained from the hydroconversion reaction zone as described in Example 8 above was distilled and separated into two fractions (480° F.+ and 480° F.−). The heavier fraction (480° F.+) was deasphalted employing autogenerated naphtha (356°–420° F.) as the deasphalting solvent, with a 4:1 solvent to feed volume ratio, at ambient temperature. Autogenerated naphtha was obtained by distilling the previously desulphurized lighter (480° F.−) fraction.

The deasphalted oil, of 60 ppm vanadium, 1.5% asphaltenes and 18 API was obtained with a yield of 950% w/w on the (480° F+) fraction.

FIG. 4 presents the quality of the deasphalted oil obtained during the 700 hours run.

EXAMPLE 10

The lighter fraction (480° F.−) of Example 9 was desulphurized as is common practice. This operation was similar to that performed in the distillates hydrotreating unit (66), FIG. 1.

The deasphalted oil obtained as in Example 9 was desulphurized in a fixed bed. The desulphurization catalyst used has the characteristics shown in Table 13.

TABLE 14
HYDRODESULFURIZATION OF DEASPHALTED OIL (480° F.+)

| Characteristics | Deasphalted Oil | Product |
|---|---|---|
| °API | 18 | 23 |
| Sulfur, % | 2.06 | 0.18 |
| Vanadium, ppm | 60 | 7 |
| Conradson Carbon Residue % | 6.2 | 2.7 |
| Asphaltenes | 1.71 | 0.49 |
| Nitrogen, ppm | 3103 | 2264 |
| Viscosity (140° F.) cst | 67 | 13.3 |
| Conditions of Run | | |
| Hydrogen Pressure, psig | 1500 | |
| LHSV, h$^{-1}$ | 0.43 | |
| Temperature in Reaction Zone, °C. | 400 | |
| Hydrogen Consumption (scf/b) | 694 | |
| Liquid Yield, % (w/w) | 94 | |
| Run Length, h | 80 | |

EXAMPLE 11

The hydroconversion processing was conducted as described in Example 1. The naturally occurring minerals used as a hydroconversion catalyst are described in Table 4 above.

Table 15 shows results obtained of hydroconversion with minerals included in Table 4 above; Table 15 also shows, for comparison purposes, results obtained with naturally occurring minerals outside the scope of the catalysts employed in the present invention but whose chemical composition, i.e., high concentration of metals of Group VIII, could have made them possible candidates as hydrocracking catalysts for heavy crude upgrading.

liquid yield, with much less conversion to the less valuable gas products. In Table 16, this feature is also demonstrated by smaller coke deposition.

After the runs described in Tables 15 and 16, above, catalysts employed could be easily separated.

EXAMPLE 12

TABLE 15
HYDROCONVERSION EXPERIMENTS AT LOW SEVERITY

| CATALYST USED | % Coke on Catalyst | Liquid Yield % w | Gas Yield % w | Product Properties ||||| Asphaltene Conversion % | Conr. Carbon Conversion % |
|---|---|---|---|---|---|---|---|---|---|---|
| | | | | °API | % Sulfur | % Conr. Carbon | % Asphaltene | Vanadium ppm | | |
| Invention Catalysts | | | | | | | | | | |
| Ferruginous laterite | 4.04 | 93.2 | 6 | 16.8 | 2.2 | 8.9 | 5.0 | 185 | 45.6 | 23.3 |
| Limonite | 3.5 | 94.3 | 5 | 16.4 | 2.2 | 7.4 | 4.3 | 115 | 53.3 | 36.2 |
| Comparison Catalysts | | | | | | | | | | |
| Hematite | 1.4 | 92.7 | 7 | 17.9 | 2.2 | 10.7 | 7.7 | 352 | 16.3 | 7.7 |
| Magnetite | 3.3 | 87.3 | 12 | 17.3 | 2.6 | 9.7 | 5.9 | 250 | 35.8 | 16.4 |
| Morichal Crude Feed Characteristics | — | — | — | 13.7 | 3.2 | 11.6 | 9.2 | 369 | — | — |

Conditions:
420° C.; 1800 psi;
60 min of batch operation;
19% w catalyst on total feed (crude plus catalyst) to the reactor;
catalyst particle size: 150/500 microns;
hydrogen flow: 4.65 l/min.

TABLE 16
HYDROCONVERSION EXPERIMENTS AT HIGH SEVERITY

| CATALYST USED | % Coke on Catalyst | Liquid Yield % w | Gas Yield % w | Product Properties ||||| Asphaltene Conversion % | Conr. Carbon Conversion % |
|---|---|---|---|---|---|---|---|---|---|---|
| | | | | °API | % Sulfur | % Conr. Carbon | % Asphaltene | Vanadium ppm | | |
| Invention Catalysts | | | | | | | | | | |
| Ferruginous laterite | 14.6 | 82.7 | 14 | 19.3 | 2.1 | 7.8 | 3.7 | 115 | 69.7 | 53.6 |
| Limonite | 22.0 | 83.6 | 11 | 26.4 | 1.7 | 6.6 | 3.1 | 62.4 | 74.6 | 60.7 |
| Comparison Catalysts | | | | | | | | | | |
| Hematite | 32.4 | 65.9 | 25 | 23.5 | 2.2 | 6.9 | 3.5 | 10.9 | 71.3 | 58.9 |
| Magnetite | 46.6 | 62.4 | 21 | 22.3 | 2.2 | 7.3 | 2.8 | 11.9 | 77.0 | 56.5 |
| Pyrite | 45.0 | 66.3 | 20 | 25.1 | 2.0 | 10.1 | 3.4 | 14.8 | 72.1 | 39.9 |
| Morichal Crude Feed Characteristics 650° F.+ | | | | 6.6 | 3.9 | 16.8 | 12.2 | 466 | | |

Conditions:
430° C.; 1800 psi:
120 min of batch operation;
19% w catalyst on total feed (crude plus catalyst) to the reaction zone;
catalyst particle size: 150/500 microns;
hydrogen flow: 4.65 l/min.

Table 15 above compares results obtained at mild conditions for two catalysts used in this invention (ferruginous laterite and limonite) and two other catalysts for comparison.

It can be seen that catalysts as used in this invention have superior performance as hydroconversion catalysts because they result, for the same liquid yield, in much higher asphaltene and Conradson Carbon conversions. Asphaltene and Conradson Carbon conversions are proportional to the vacuum residue conversion and consequently the catalysts used in this invention provide a consistent advangage for heavy crude upgrading because they convert efficiently the less valuable part of the heavy crude, the asphalt, into distillates of high value, with little loss to coke and gas, of less worth.

Table 16 presents results at higher severity for two catalysts within the scope of the formula (I) used in this invention (ferruginous laterite, limonite), and three other comparison catalysts (hematite, magnetite and pyrite). It can be seen that catalysts used in the present invention, for a similar level of asphaltene and Conradson Carbon conversion, provide considerably higher An experimental run was performed using a natural mineral, ferruginous laterite, as a catalyst in the process of this invention. The catalyst was dried and then ground and sieved. The particle size fraction between 150 and 500 microns was analyzed, its chemical composition being indicated in Table 4. This mineral was calcined in a fixed-bed, at 800° C., in air for one hour. This pretreatment did not change the specific surface area of the mineral but its pore volume increased from 0.1 to 0.29 cm$^3$/g. The pore size distribution of the catalyst is within that of Table 5.

This hydroconversion catalyst was contacted with Morichal heavy crude, whose characteristics are shown in Table 15, above. The conditions of this run are also shown in Table 15 above.

After the experiment the solid was centrifuged, xylene washed in a Soxhlet extractor and dried. Analysis showed 4% coke; 3% sulfur and 2350 ppm of vanadium on catalyst. The liquid product yield was 93.2%. Its characteristics appear in Table 15.

The extent of devanadization of the crude was 50% and asphaltene and Conradson Carbon conversions were 45.6% and 23.3%, respectively.

EXAMPLE 13

A similar run to that referred to in Example 12 above performed using limonite, as shown in Table 4 above. This material was also dried, ground and sieved. The particle size fraction, 150 to 500 microns, was calcined in air at 400° C. for three hours. The textural properties, after calcination, appear in Table 5, above.

For this hydroconversion run, this catalyst was contacted with Morichal crude. The characteristics of this heavy high metal and high asphaltene concentration feedstock are shown in Table 15 where also the conditions for this run are indicated.

After the run, the solid was centrifuged, xylene extracted and dried. Chemical analysis showed a deposit of 3.5% of coke, 4% sulfur and 1275 ppm vanadium.

A very high liquid yield of upgraded product was obtained in this run (94.3%). The devanadization of the crude was 69% and Conradson Carbon and asphaltene conversions were 36.2% and 53.3%, respectively.

EXAMPLE 14

Another run was conducted with the same catalyst of Example 12 above with the exception that the catalyst particle side was all less than 5 microns. The chemical composition of the catalyst is shown in Table 4 above. It was calcined in air, in a fixed-bed, at 800° C. Its pore volume, after thermal activation, was 0.8 cm$^3$/g.

Cerro Negro 650° F.+ residue was used for this hydroconversion. The conditions of this three hour duration run appear in Table 17 below.

After the run the used catalyst was centrifuged, xylene extracted and dried. Chemical analysis showed 25.6% coke, 10% sulfur and 3300 ppm vanadium on the catalyst.

The yield of the upgraded liquid product was 80%; and the characteristics of the product are shown in Table 17 above. Devanadization of the crude was 93% and Conradson carbon and asphaltene conversion achieved were 61.0% and 77.8%, respectively.

Results of other hydroconversion experiments performed with a catalyst which had been employed twice previously in runs similar to that previously referred in this Example are also shown in Table 17. The catalyst was subjected to two thermal regenerations showing a vanadium concentration of 7500 ppm. The other characteristics of the chemical composition of this catalyst were the same as those of the fresh catalyst. Its pore volume was 0.67 cm$^3$/g.

This previously used catalyst was contacted with the same Cerro Negro 650° F.+ residue as described above under conditions specified in Table 17. After the run, the solid was centrifuged, xylene washed and dried. The coke deposited on the catalyst was 24.8%; sulfur content 9% and vanadium concentration, 9700 ppm.

The yield of the upgraded liquid product was 84%. The Conradson Carbon and asphaltene conversions obtained were 68.5% and 82.5%, respectively.

These results demonstrate the feasibility of recycling of regenerated hydroconversion catalyst to the heavy crude upgrading hydroconversion process.

EXAMPLE 15

Tests were run under the conditions of examples 1–3, to demonstrate the feasibility of recyling vacuum bottoms to the hydroconversion reaction zone. The tests were conducted at 1500 psig pressure, 439° C. and about 0.5 hr.$^{-1}$ space velocity. The results of a 30 day test run are reported in Tables 18 and 19 below.

TABLE 18

| Recycle Bottoms Test Results | | |
|---|---|---|
| Hours-On-Stream | Liquid Yield, wt % | Hydrogen Consumption (SCF/b) |
| 235 | 92.21 | 732 |
| 254 | 91.63 | 713 |
| 399 | 92.74 | 616 |

No deterioration of process performance was observed. The liquid yields remained high and the hydrogen consumption was extremely low considering that the vacuum bottoms were recycled.

TABLE 19

| Analysis of 950° F.+ Recycle Residue | | |
|---|---|---|
| Characteristic | Bottoms Analysis with Recycle | Bottoms Analysis without Recycle |
| API gravity | 2.0 | 3.1 |
| Vanadium, ppm | 160 | 130 |
| Viscosity (210° F.), cst. | 1,500 | 3,000 |
| Conradson Carbon, % | 23.0 | 25.5 |
| Asphaltenes, % | 15.0 | 16.6 |

TABLE 17

| | HYDROCONVERSION RUNS WITH CERRO NEGRO CRUDE | | | | | | | | | |
|---|---|---|---|---|---|---|---|---|---|---|
| | | | | Product Properties | | | | | Asphaltene Conversion % | Conr. Carbon Conversion % |
| CATALYST USED | % Coke on Catalyst | Liquid Yield % w | Gas Yield % w | °API | % Sulfur | % Conr. Carbon | % Asphaltene | Vanadium ppm | | |
| Ferruginous Laterite | 25.6 | 80.0 | 15 | 22.8 | 2.13 | 6.66 | 3.04 | 39 | 77.8 | 61.0 |
| Ferruginous Laterite after Two Passes and Two Thermal Regenerations | 24.8 | 84.0 | 11 | 25.9 | 2.01 | 5.34 | 2.35 | 33 | 82.8 | 68.7 |
| Feed Characteristics 650° F.+ Residue of Cerro Negro crude | | | | 6.4 | 4.51 | 17.07 | 13.71 | 586 | | |

Conditions:
430° C.; 1800 psi;
180 min of batch operation;
19% w catalyst on total feed (crude plus catalyst) to the reaction zone;
catalyst particle size: < 5 microns
hydrogen flow: 4.65 l/min.

As seen in Table 19, the use of recycle does not show a marked deterioration of bottoms product characteristics with recycle. Indeed, Conradson Carbon and asphatene content, which are normally the limiting characteristics are improved. By contrast, competitive hydroconversion routes of the present invention provide a vacuum residue of an API gravity below zero and a Conradson Carbon of 30 to 42% under these conditions as disclosed in "H-Oil: A Flexible Process for Maximum Distillate Yield from Vacuum Residues", Richard M. Eccles; 5 OGENW/DGMK-GEMEINSCHAFTSTAGUNG, VOM 22, BIS 24, October 1980, in Munchen; "H-Oil: Texaco's Design for Flexibility", 1982 NPRA Annual Meeting, R. M. Eccles and A. M. Gray, Mar. 21-23, 1982, San Antonio, Tex.; "Heavy Oil Upgrading via Hydrocracking Economics", L. L. Fornoff and R. P. van Driesen, Second International Conference, Heavy Crude and Tar Sands, Caracas, Venezuela, February 1982.

EXAMPLE 16

Runs were performed employing thermal activated iron laterite and presulphided iron laterite. Presulphidation of iron laterite was performed under the following conditions: 400 psi, 300° C., 20% V, $H_2S$ in hydrogen, 4 hours of presulphiding time. The experimental set-up, feedstock employed, etc., were the same as in Example 8 above. The results in Table 20 below show that presulphided laterite is as good a catalyst as unsulphided laterite.

TABLE 20
PRESULPHIDED ACTIVATED IRON LATERITE VS UNSULPHIDED MATERIAL
HYDROCONVERSION CONTINUOUS PLANT RUNS

| | Temperature (°C.) | |
|---|---|---|
| | 410 | 410 |
| | LHSV($h^{-1}$) | |
| | 0.5 | 0.5 |
| Catalyst | Iron Laterite (5% fresh unsulphided) | Iron Laterite (5% presulphided) |
| Particle Diameter (microns) | 5-50 | 5-50 |
| Quality of Hydroconverted Heavy Crude | | |
| °API | 16 | 17.5 |
| Sulphur, % | 2.06 | 1.9 |
| Vanadium, % | 160 | 100 |
| Con. Carbon, % | 8.5 | 7.0 |
| Asphaltenes, % | 5.5 | 4.0 |
| Nitrogen, ppm | 4500 | 4800 |

While the invention has been described in detail and with respect to various embodiments thereof, it is apparent that various changes and modifications may be made therein without departing from the spirit and scope thereof.

What is claimed is:

1. The process for hydroconverting a heavy hydrocarbon feedstock containing at least 200 ppm metals, having less than 20% API gravity and more than 8% Conradson carbon, which comprises contacting said feedstock in a hydroconversion reaction zone with hydrogen in the presence of a natural inorganic material as a catalyst, said inorganic material being selected from the group consisting of (1) iron laterite having a chemical formula consisting essentially of (($\gamma$FeOOH . (1−$\gamma$) $Fe_2O_3$ . $nH_2O$ $\alpha$AlO(OH)) $(SiO_2)_x$ $(FeTiO_3)_y$ $(TiO_2)_z$ with $\gamma$ much greater than (1−$\gamma$)) with a $Fe_2O_3$ content of greater than or equal to 45.0 wt. %, (2) limonite having a chemical formula consisting essentially of (($\gamma Fe_2O_3$ . $nH_2O$) (1−$\gamma$) $Fe_3(PO_4)_2.8H_2O$ $\alpha Al_2O_3$.n-$H_2O$ $(SiO_2)_x$ with $\gamma$ much greater than (1−$\gamma$)) with an $Fe_2O_3$ content of greater than or equal to 45.0 wt. %, and (3) mixtures thereof.

2. The process as defined in claim 1 further including enhancing the activity of said natural inorganic material by subjecting said natural inorganic material to a thermal treatment at a temperature between about 400° C. and 1100° C. for about 1 minute to about 4 hours and results in the following catalyst characteristics:
   (a) a specific surface area, $S_g$, in square meters per gram of about 10 to about 200;
   (b) a specific pore volume, $V_p$, in cubic centimeters per gram of about 0.1 to about 0.9;
   (c) an average pore diameter, $\bar{d}$, in angstroms of about 20 to about 3600, where $\bar{d} = 4V_p/S_g$; and
   (d) a pore size distribution in accordance with the following:

| Pores of Radius r (in angstroms) | Percentage of Total Pore Volume |
|---|---|
| greater than 1000 | 5 to 60 |
| 1000 to greater than 300 | 5 to 50 |
| 300 to greater than 100 | 5 to 30 |
| 100 to greater than 40 | 6 to 30 |
| 40 or less | 4 to 60 |

3. The process as defined in claim 2 wherein the specific surface area, $S_g$, in square meters per gram is about 20 to 150, the specific pore volume, $V_p$, in cubic centimeters per gram is about 0.2 to 0.8 and the average pore diameter, $\bar{d}$, in angstroms is about 53 to 1600, where $\bar{d} = 4V_p/S_g$.

4. The process as defined in claim 1 wherein before contacting the heavy crude, said catalyst is presulphided by contacting said catalyst with a sulphur containing liquid stream.

5. The process as defined in claim 1 wherein said catalyst has a surface area of 20 to 150 m$^2$/g, a specific pore volume of 0.1 to 0.9 cm$^3$/g, an average pore diameter of 53 to 1600 Å and a pore size distribution in accordance with the following:

| Pores of Radius r (in angstroms) | Percentage of Total Pore Volume |
|---|---|
| greater than 1000 | 20 to 50 |
| 1000 to greater than 300 | 10 to 40 |
| 300 to greater than 100 | 8 to 25 |
| 100 to greater than 40 | 6 to 10 |
| 40 or less | 4 to 30 |

6. The process as defined in claim 1 wherein before contacting the heavy crude, said catalyst is presulphided in a hydrogen/hydrogen sulphide atmosphere.

7. The process as defined in claim 1 wherein said catalyst has a particle diameter between 0.001 cm and 0.1 cm, wherein said catalyst is fed to the hydroconversion reaction zone in an amount of 1 to 15% by weight based on the total amount of feedstock and catalyst, and wherein the catalyst inventory in said reaction zone is between 5 and 30% by weight.

8. The process as defined in claim 1 wherein said catalyst has a particle diameter between 0.05 and 0.5 inches, wherein said catalyst is fed to a moving bed reaction zone in an amount of 1 to 15% by weight based upon the total amount of feedstock and catalyst, and wherein the catalyst inventory in said reaction zone is between 20% and 80% by weight.

9. The process as defined in claim 1 wherein the process includes fractionating the hydroconversion product and recycling at least a portion of the product boiling higher than about 1000° F. to the hydroconversion reaction zone.

10. The process as defined in claim 6 wherein the process additionally includes separating the catalyst from said hydroconversion reaction zone.

11. The process as defined in claim 7 wherein the process additionally includes separating the catalyst from said hydroconversion reaction zone.

12. The process as defined in claim 1 wherein the process additionally includes separating the catalyst from said hydroconversion reaction zone.

13. The process of claim 12 wherein the catalyst is separated from the said hydroconversion product by means of centrifugal decanting, enctrifuging or a combination of centrifugal decanting and centrifuging.

14. The process as defined in claim 1 wherein the liquid hour space velocity in the hydroconversion reaction zone is between about 0.1 $h^{-1}$ and about 100 $h^{-1}$ (V feedstock/V reaction zone h) and the hydrogen-to-feedstock ratio is between about 560 and about 60,000 $scfH_2/b$.

15. The process as defined in claim 1 wherein the hydrogen pressure in said hydroconversion reaction zone is between about 600 and about 4000 psig and the temperature is between about 660 and about 950° F.

16. (Amended) The process as defined in claim 1 wherein said process additionally includes fractionating the hydroconversion product into a distillate fraction and a bottoms fraction, and deasphalting the bottoms fraction with a light solvent having 3 or more carbon atoms to produce a deasphalted oil, with the solvent being added in the deasphalting unit such that the total solvent/bottoms ratio is between about 4:1 and 1:1 by weight.

17. (Amended) The process as defined in claim 1 wherein said process additionally includes fractionating the hydroconversion product into a distillate fraction and a bottoms fraction, and deasphalting the bottoms fraction with a light solvent having 3 or more carbon atoms to produce a deasphalted oil, with the solvent being added in the deasphalting unit such that the total solvent/bottoms ratio is between about 4:1 and 1:1 by weight, and wherein said solvent is a 230°–410° F. fraction of the distillate fraction generated by the process.

18. The process as defined in claim 1 wherein said process additionally includes fractionating the hydroconversion product into a distillate fraction and a bottoms fraction, and deasphalting the bottoms fraction with a light solvent having 3 or more carbon atoms to produce a deasphalted oil, with the solvent being added in the deasphalting unit such that the total solvent/bottoms ratio is between about 4:1 and 1:1 by weight, and wherein the temperature of the deasphalting is between about 80° and about 400° F. and the total pressure is between about 1 and about 60 atmospheres.

19. The process as defined in claim 1 wherein said process additionally includes fractionating the hydroconversion product into a distillate fraction and a bottoms fraction, and deasphalting the bottoms fraction with a light solvent having 3 or more carbon atoms to produce a deasphalted oil, with the solvent being added in the deasphalting unit such that the total solvent/bottoms ratio is between about 4:1 and 1:1 by weight, and wherein the process additionally comprises desulfurizing the deasphalted oil employing fixed beds composed of one or more desulfurizing catalysts arranged in one or more desulfurizing reaction zones.

20. The process as defined in claim 1 further comprising separating the hydroconversion catalyst, regenerating the separated hydroconversion catalyst with carbon thereon by contacting the catalyst at elevated temperatures with an oxygen-containing gas to reduce the carbon content of the hydroconversion catalyst, and recycling at least a portion of the regenerated hydroconversion catalyst to the hydroconversion reaction zone.

21. The process as defined in claim 1 further comprising separating the hydroconversion catalyst and totally or partially recycling said catalyst back to the hydroconversion reaction zone.

22. The process as defined in claim 19 wherein each desulfurizing reaction zone is operated at substantially the same temperature and pressure, said temperature being between about 660 and about 840° F. and said pressure being between about 200 to about 3000 psig, at a residence time in the desulfurizing reaction zone of between about 0.5 and about 3.5 hours, and at a linear liquid velocity in the desulfurizing reaction zone between about 15 and about 150 feet/hour.

23. The process as defined in claim 19 wherein the desulfurizing catalyst employed in the desulfurizing reaction zone is prepared by successive impregnation of macroporous alumina with metals of Group VIB and Group VIII, said impregnation employing soluble salts of said metals, a contact time between about 1 and about 5 hours, a drying temperature between about 170° and about 250° F., and a calcination temperature between about 750° and about 1100° F.

24. The process as defined in claim 19 wherein the desulfurizing catalyst employed in a first desulfurizing catalytic bed contains up to about 10% by weight Group VIB metals and up to about 8% by weight Group VIII metals, and wherein the desulfurizing catalyst employed in other desulfurizing catalytic beds contains up to about 20% by weight Group VIB metals and up to about 8% by weight Group VIII metals.

25. The process as defined in claim 19 wherein the desulfurizing catalyst employed in a first desulfurizing catalytic bed contains up to about 10% by weight Group VIB metals and up to about 8% by weight Group VIII metals, and wherein the desulfurizing catalyst employed in other desulfurizing catalytic beds contains up to about 20% by weight Group VIB metals and up to about 8% by weight Group VIII metals, wherein the desulfurizing catalyst in said first bed has a pore volume distribution with up to about 50% of the pore volume of radii larger than about 100 Å and with up to about 40% of the pore volume of radii between about 50 and about 100 Å, and wherein the desulfurizing catalyst in the other of said beds has a pore volume distribution with up to about 20% of the pore volume of radii larger than about 100 Å and with about 20 to about 40% of the pore volume of radii between 30 and 100 Å.

26. The process as defined in claim 20 wherein the recycled catalyst exhibits a molar ratio of vanadium to iron of less than about 5.0:1 and a molar ratio of vanadium to $Al_2O_3$ plus $SiO_2$ of less than about 20:1.

27. The process as defined in claim 20 wherein said process additionally includes fractionating the hydroconversion product into a distillate fraction and a bottoms fraction, deasphalting the bottoms fraction with a light solvent having 3 or more carbon atoms to produce a deasphalted oil, with the solvent being added in the deasphalting unit such that the total solvent/bottoms ratio is between about 4:1 and 1:1 by weight, and further comprising separating the hydroconversion catalyst fines by filtration after said deasphalting and after diluting the asphalt with less than 40% by weight of a hydrocarbon diluent.

28. The process as defined in claim 20 wherein said process additionaly includes fractionating the hydroconversion product in vacuum and atmospheric towers into a distillate fraction and a bottoms fraction, desulfurizing the distillate fraction thereof, deasphalting the bottoms fraction with a light solvent having 3 or more carbon atoms to produce a deasphalted oil, with the solvent being added in the deasphalting unit such that the total solvent/bottoms ratio is between about 4:1 and 1:1 by weight, and employing the asphalt residue thereof as a fuel for steam and energy production.

29. The process as defined in claim 20 wherein said process additionally includes fractionating the hydroconversion product into a distillate fraction, a vacuum gas-oil fraction and a vacuum bottoms fraction, desulfurizing the resulting distillates and vacuum gas-oils and employing the bottoms fraction thereof as a fuel for steam and energy production.

* * * * *

UNITED STATES PATENT AND TRADEMARK OFFICE
CERTIFICATE OF CORRECTION

PATENT NO. : 4,591,426

DATED : May 27, 1986

INVENTOR(S) : Julio H. Krasuk et al.

It is certified that error appears in the above-identified patent and that said Letters Patent is hereby corrected as shown below:

Column 31, claim 11, line 9, change "prooess" to read --process--.

Column 31, claim 13, line 17, change "enctrifuging" to read --centrifuging--.

Column 31, claim 14, line 22, after "zone" and before "h" insert --"--.

Column 31, claim 16, line 29, delete "(Amended)".

Column 31, claim 17, line 38, delete "(Amended)".

Column 33, claim 28, line 7, change "additionaly" to read --additionally--.

Signed and Sealed this

Twenty-sixth Day of August 1986

[SEAL]

Attest:

DONALD J. QUIGG

Attesting Officer

Commissioner of Patents and Trademarks